United States Patent [19]

Krämer et al.

[11] Patent Number: 4,838,763

[45] Date of Patent: Jun. 13, 1989

[54] CANNED MOTOR PUMP

[75] Inventors: Roland Krämer, Gundelfingen; Robert Neumaier, Glottertal, both of Fed. Rep. of Germany

[73] Assignee: Heyko Reinecker, Freiburg, Fed. Rep. of Germany

[21] Appl. No.: 123,610

[22] Filed: Nov. 20, 1987

[30] Foreign Application Priority Data

Nov. 20, 1986 [DE] Fed. Rep. of Germany ....... 3639720
Jun. 4, 1987 [EP] European Pat. Off. ......... 87108088.3

[51] Int. Cl.$^4$ ............................................. F04B 49/00
[52] U.S. Cl. ....................................... 417/63; 417/420; 417/423.11; 417/423.14; 464/29
[58] Field of Search ................. 417/63, 372, 373, 420, 417/423 R, 423 M, 423 P, 423 T; 464/17, 29; 310/87, 57, 52, 54, 55, 64; 73/46; 340/682; 92/5 R; 165/47, 70, 11.1

[56] References Cited

U.S. PATENT DOCUMENTS

| | | | |
|---|---|---|---|
| 2,662,478 | 12/1953 | Surre | 417/63 |
| 3,131,638 | 5/1964 | Wilson et al. | 92/5 R |
| 3,163,790 | 12/1964 | White | 310/54 |
| 3,605,566 | 9/1971 | Vetter | 417/63 |
| 3,661,060 | 5/1972 | Bowen | 417/63 X |
| 4,013,384 | 3/1977 | Oikawa | 417/420 X |
| 4,120,618 | 10/1978 | Klaus | 417/420 |
| 4,226,574 | 10/1980 | Villette | 417/420 |
| 4,569,634 | 2/1986 | Mantell | 417/63 |
| 4,752,194 | 6/1988 | Wienen et al. | 417/420 |

FOREIGN PATENT DOCUMENTS

| | | |
|---|---|---|
| 7638 | 2/1953 | Fed. Rep. of Germany . |
| 943739 | 12/1955 | Fed. Rep. of Germany . |
| 1926000 | 10/1965 | Fed. Rep. of Germany . |
| 1226740 | 10/1966 | Fed. Rep. of Germany . |
| 1983928 | 4/1968 | Fed. Rep. of Germany . |
| 1907677 | 8/1970 | Fed. Rep. of Germany . |
| 2014047 | 10/1971 | Fed. Rep. of Germany . |
| 2912938 | 10/1980 | Fed. Rep. of Germany . |
| 8208046 | 7/1982 | Fed. Rep. of Germany . |
| 3207436 | 9/1983 | Fed. Rep. of Germany . |
| 3334638 | 3/1984 | Fed. Rep. of Germany ........ 417/63 |
| 3337086 | 5/1985 | Fed. Rep. of Germany . |
| 3413930 | 10/1985 | Fed. Rep. of Germany . |
| 1033425 | 7/1953 | France . |
| 748708 | 5/1956 | United Kingdom . |
| 2145882 | 4/1985 | United Kingdom . |

OTHER PUBLICATIONS

CAV (Chemie, Anlagen und Verfahren), FIGS. 6-8, p. 100 (Aug. 1985).
DIN 6618, Teil 3 (Oct. 1981) (German Standard).

Primary Examiner—Carlton R. Croyle
Assistant Examiner—Eugene L. Szczecina, Jr.
Attorney, Agent, or Firm—Peter K. Kontler

[57] ABSTRACT

A canned motor pump wherein the can has at least two coaxial tubular walls defining an annular space for the flow of a preferably gaseous fluid which is used to facilitate detection of leaks in the walls of the can. Each tubular wall can individually seal the driving unit from the driven unit of the pump motor. The leak detector can generate visible, audible and/or otherwise detectable signals, and such signals can also serve to stop the motor in the event of leakage.

45 Claims, 12 Drawing Sheets

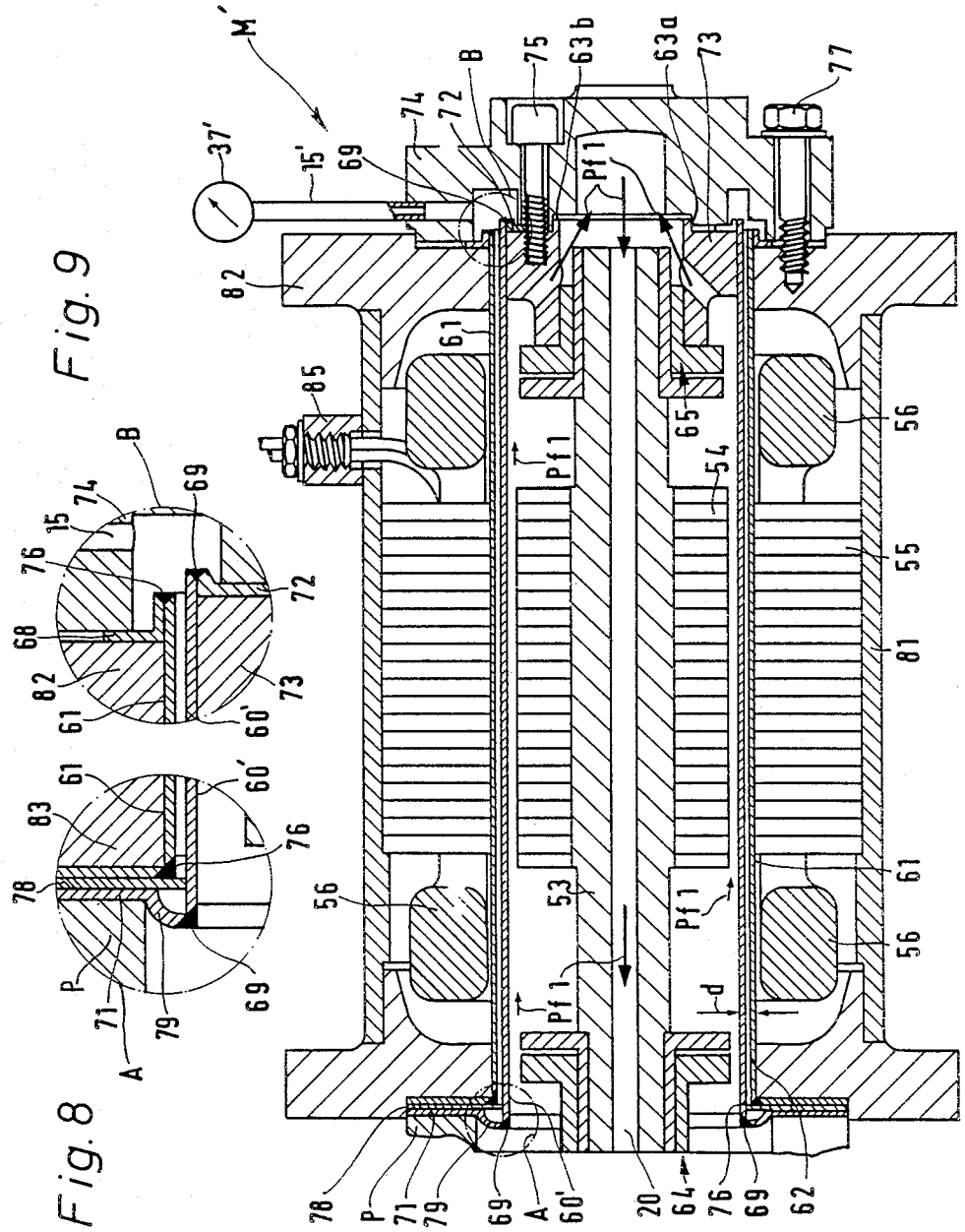

CANNED MOTOR PUMP

CROSS-REFERENCE TO RELATED CASE

The pump of the present invention is similar to the pump which is disclosed in the commonly owned co-pending patent application Ser. No. 122111 filed Nov. 18, 1987 for "Canned motor pump".

BACKGROUND OF THE INVENTION

The invention relates to improvements in fluid flow machines in general, and more particularly to improvements in so-called canned motor pumps wherein a can (normally a tube made of high-quality steel or the like) is installed between the driving and driven units of the motor which rotates one or more pumping elements. The purpose of the can is to hermetically seal the driving and driven units from each other.

German Utility Model No. 82 08 046 discloses a canned motor pump wherein the can comprises a single tubular wall which is mounted in the pump housing to seal the driving unit from the driven unit. The can is designed with a view to offer a minimum of resistance to magnetic torque transmitting forces between the driving and driven units of the pump motor. Such pumps are frequently used to convey highly aggressive or otherwise harmful or dangerous fluid media which must be hermetically sealed from the surrounding area in order to avoid damage to or destruction of the pump and/or injury to the attendants.

Presently known canned motor pumps of the type disclosed in German Utility Model No. 82 08 046 exhibit a number of serious drawbacks. For example, such pumps are likely to permit leakage of conveyed fluid media into the surrounding area in the event of leakage of the can. Such leakage can develop for any one of a number of different reasons including damage to the bearings for the driven unit, corrosion of the material of the can as a result of contact with chemically aggressive fluid media and/or contamination of the conveyed fluid medium, for example, by solid particles which rub against the can and cause the development of leaks and/or improper centering of the driving and driven units relative to each other and/or relative to the can. If the means for transmitting torque between the driving and driven units of a canned motor pump is a magnetic coupling, the support for the outer magnet or magnets must be mounted with a very high degree of accuracy; even small deviations of the position of such support from an optimum position can entail extensive damage to the can and leakage of conveyed fluid medium into the surrounding area. The situation is aggravated because the can is normally extremely thin in order to reduce magnetic losses between the driving and the driven units of the pump motor. Any (even very slight) leakage of certain types of conveyed fluid media can result in substantial damage to or in total destruction of the pump, injury to the attendants, ecological damage and/or damage to external components of the pump as well as to components which are connected to or adjacent the pump.

The aforementioned German Utility Model discloses specially designed seals which are to prevent the escape of conveyed fluid media in the event of damage to the can. This publication further discloses means for turning off the pump in the event of damage to the can. However, such undertakings are not entirely satisfactory and sufficient under all circumstances of use, for example, because the seals which are proposed in the Utility Model are normally dynamic seals which offer only limited protection against escape of conveyed fluid medium.

OBJECTS AND SUMMARY OF THE INVENTION

An object of the invention is to provide a novel and improved can for use in canned motor pumps of the type wherein the motor includes a magnetic coupling or constitutes an electric motor.

Another object of the invention is to provide a canned motor pump wherein the can can stand more abuse and has a longer useful life than the cans in conventional canned motor pumps.

A further object of the invention is to provide the pump with novel and improved means for rapidly detecting damage to the can and with novel and improved means for undertaking necessary measures in the event of damage to the can.

A further object of the invention is to provide novel and improved means for monitoring the condition of the can in a canned motor pump.

Still another object of the invention is to provide a can which can be installed in certain existing types of canned motor pumps with a minimum of modifications.

A further object of the invention is to provide a canned motor pump wherein the can can stand longer periods of use but need not offer a greater resistance to torque-transmitting forces than heretofore known cans.

An additional object of the invention is to provide a can which can be installed in and removed from a canned motor pump housing within short intervals of time and without necessitating any milling, welding or similar complex operations.

Another oject of the invention is to provide a novel and improved method of hermetically sealing the driving unit from the driven unit in the motor of a canned motor pump.

The invention is embodied in a canned motor pump which comprises a hollow driving unit, a rotary driven unit which is at least partially surrounded by the driving unit, and means for sealing the driving and driven units from each other. In accordance with a feature of the invention, the sealing means comprises a can which is interposed between the driving and driven units and includes a plurality of walls. The walls of the can preferably include at least two tubular walls having a common axis which coincides with or is close to the axis of rotation of the driven unit. One of the tubular walls is at least partially surrounded by the other tubular wall.

The walls of the can preferably define at least one space, and such pump preferably further comprises means for monitoring the integrity of the walls. Such monitoring means preferably includes a portion which is installed or confined in the aforementioned space between the walls of the can. This portion of the monitoring means can include a supply of fluid (preferably a gaseous fluid) in the space between the walls of the can, and such monitoring means further comprises a device which monitors at least one variable characteristic (particularly the pressure) of the fluid in the space. Alternatively, or in addition to such fluid-employing devices, the monitoring means can include means for generating signals in response to detection of a leak in at least one wall of the can.

The substantially concentric first and second tubular walls of the can define an annular space having a width in the radial direction of the tubular walls such as to allow for circulation of a gaseous fluid therein but to at least greatly obstruct the circulation of a liquid.

The tubular walls can be provided with abutting portions. To this end, the confronting surfaces of the tubular walls can be provided with suitably distributed protuberances which extend from the external surface of the inner tubular wall toward and preferably into contact with the internal surface of the outer tubular wall and/or vice versa.

If the monitoring means includes a supply of gaseous or other fluid which is confined in the space between the walls of the can, the monitoring means preferably comprises means for maintaining the fluid in such space at a pressure which deviates from the pressure around the can. In many instances, the pressure in the space between the walls of the can will at least slightly exceed the pressure around the can. Means is provided to admit the fluid into the space between the walls of the can, and the monitoring means can include a device (such as a pressure gauge) which monitors at least one parameter of the fluid in the fluid admitting means. The admitting means can be provided in a support which can constitute a component part of or which can be attached to the housing of the pump. The support defines an inlet for admission of fluid into the space between the walls of the can. The tubular walls have end portions in the region of the inlet, and the inlet preferably communicates with an end of the annular space which is defined by the tubular walls of the can.

The can further comprises an end wall which is rigid with at least one of the tubular walls at one axial end of the can. At least a portion of the end wall of the can can include a plurality of panels. Such panels can define at least one space which communicates with the annular space between the tubular walls of the can. This can preferably defines at least one path wihch is satisfactory for the flow of a gaseous fluid between the annular space intermediate the tubular walls and the space or spaces between the panels of the end wall of the can. Means is preferably provided for sealingly and mechanically connecting at least one of the tubular walls of the can to the end wall. Such connecting means can comprise at least one welded seam. The arrangement may be such that the end wall of the can comprises first and second panels and the connecting means includes means for connecting one of the tubular walls with one of the panels and means for connecting another of the tubular walls with another panel.

The means for monitoring the walls of the can for the presence of leaks can include a detector which is installed in at least one space defined by the walls of the can and serves to transmit signals (for example, electric signals) which denote the condition of at least one wall of the can. Such monitoring means can further comprise an alarm device which is responsive to signals from the detector. In addition, the pump can be equipped with means for arresting the pump motor in response to signals from the detector. The detector can include an at least partially conductive foil in the space between two neighboring tubular walls of the can. Such foil can be made, at least in part, of a heat-conducting and/or pressure-resistant material.

The thickness of at least one tubular wall of the can (particularly the thickness of the outer of two concentric tubular walls) is preferably a function of the pressure in the pump adjacent the one wall. As a rule, or in many instances, the thickness of the inner wall will or can be less than that of the outer tubular wall. The arrangement is preferably such that at least one of the tubular walls is elastically deformable into contact with the other wall in the event of a leak in at least one of the tubular walls. For example, if the outer tubular wall of the can develops a leak, the inner tubular wall can be flexed by the pressure of fluid medium in the interior of the can so that it bulges outwardly and bears against the leaking portion or portions of the outer can to thus prevent escape of the fluid which is or can be confined in the space between the tubular walls into the conveyed fluid medium.

If it is desirable to avoid contact of conveyed fluid medium with any other fluids (such as the aforementioned gaseous fluid which can be used in the space or spaces between the walls of the can), the pump can be designed in such a way that a portion of the fluid medium is conveyed by the pumping element or elements that receive torque from the driven unit into the space or spaces between the walls of the can. In other words, the composition of the fluid in the interior of the can is then the same as the composition of the fluid medium which is being conveyed by the improved canned motor pump.

The housing of the improved pump can be provided with or can receive means for separably mounting at least one of the tubular walls of the can in the housing so that the one tubular wall is removable from and reinsertable into the housing. The aforementioned end wall can include a panel affixed to and movable with that tubular wall which can be readily installed in and removed from the housing. The means for separably mounting at least one tubular wall of the can in the housing is preferably adjacent that end of the can which is nearer to the pumping element or elements of the improved canned motor pump. Alternatively, or in addition to such mounting means, the pump can be equipped with a support which is affixed to the one tubular wall of the can in the region of that end of the can which is remote from the pumping element or elements. The mounting means can include at least one flange-like support adjacent that end of the can which is remote from the pumping element or elements. Such support has first and second portions which respectively surround the corresponding ends of the first and second tubular walls of the can, and sealing elements (for example, O-rings) interposed between each portion of the support and the respective tubular wall. To this end, the support can be provided with chamfered inner portions which are adjacent the ends of the respective tubular walls and provide space for the corresponding sealing elements. The just mentioned support can be provided with means (such as a channel, a nozzle or a nipple) for admitting a fluid into the space or spaces between the walls of the can.

The housing of the pump can comprise an end wall which is adjacent the just discussed support, and the end wall is preferably provided with means (such as an annular shoulder) for centering the support with reference to the driven unit of the pump motor. The housing can further include a closure which is adjacent the support, and the pump can further comprise a bearing for the driven unit as well as a seat which is integral with the closure and centers the bearing with reference to the driving and driven units. The closure can comprise means for centering at least one tubular wall of the can, and the support can include means for centering the closure with reference to the driving and driven units.

The novel features which are considered as characteristic of the invention are set forth in particular in the appended claims. The improved pump itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 7 is a fragmentary axial sectional view of a canned motor pump which constitutes a second modification of the pump shown in FIG. 2;

FIG. 8 is an enlarged view of a detail within the phantom-line circle A in FIG. 7;

FIG. 9 is an enlarged view of a detail within the phantom-line circle B in FIG. 7;

DESCRIPTION OF THE PREFERRED EMBODIMENTS

Figure 1:
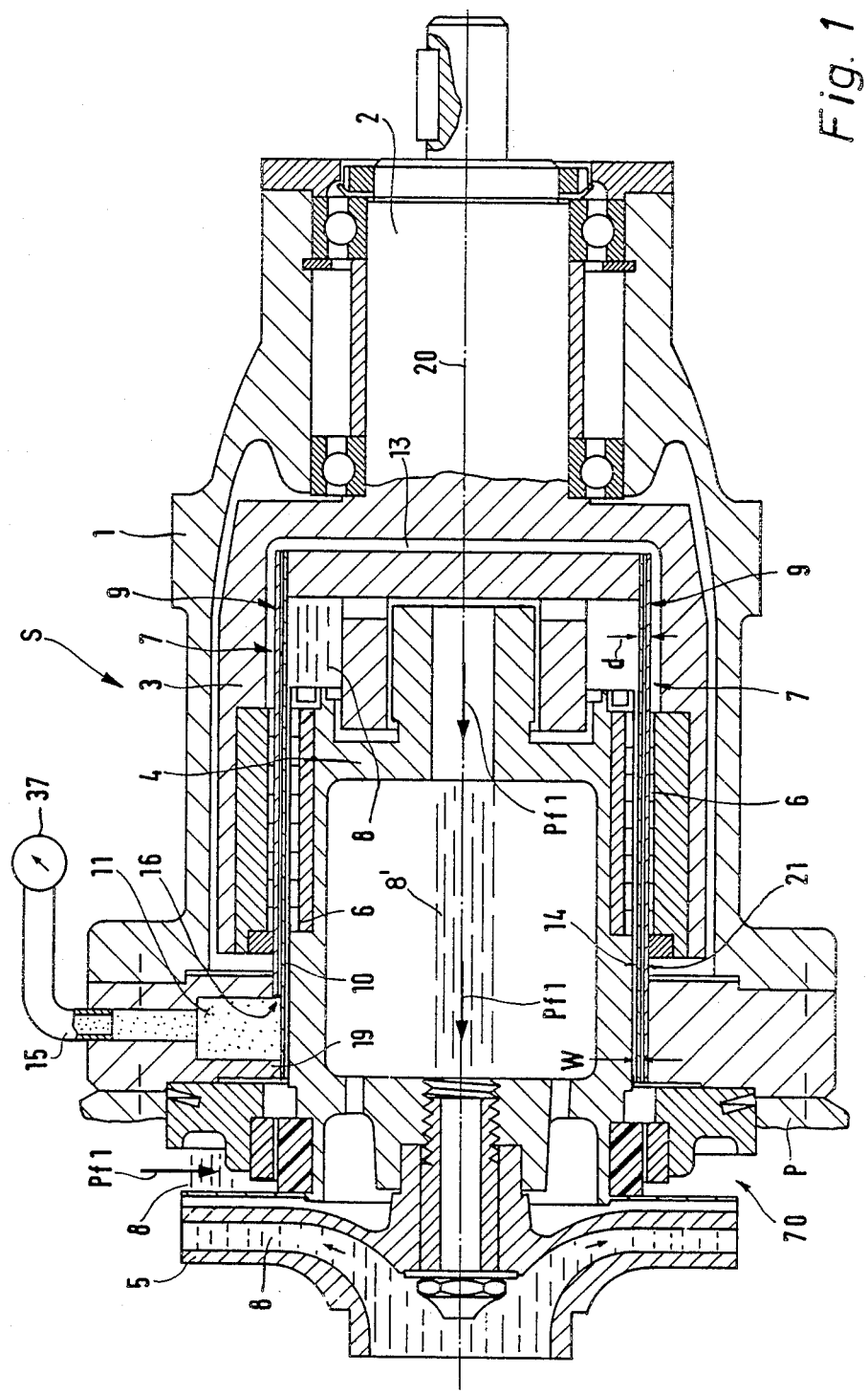
FIG. 1 is a fragmentary axial sectional view of a canned motor pump which embodies one form of the invention and wherein the motor comprises a magnetic coupling which transmits torque from the driving unit to the driven unit, the improved can having a one-piece end wall.

FIG. 1 shows a portion of a canned motor pump S which includes a pump housing P having a tubular extension 1 which surrounds a driving unit of the pump motor. The driving unit includes a motor-driven shaft 2 and a hollow rotor 3 which is rigid with the left-hand end of the shaft 2 and surrounds a portion of a rotary driven unit 4. The common axis of the driving and driven units is shown at 20. The manner in which the right-hand end of the shaft 2 receives torque from a suitable motor forms no part of the present invention. The rotor 3 of the driving unit resembles a cup and is received with requisite clearance in the corresponding portion of the tubular extension 1 of the pump housing P. The left-hand end portion of the driven unit 4 carries one or more pumping elements 5 (e.g., in the form of impellers) which are installed in the internal space 70 of the pump housing P and serve to convey a fluid medium 8 which is supplied axially from the left (as seen in FIG. 1) to flow radially outwardly into the next stage of the pump or into the outlet (not shown) of the pump housing.

The means for transmitting torque from the rotor 3 of the driving unit to the driven unit 4 of the pump motor comprises two sets of magnets 6 which are disposed at opposite sides of a tubular portion of means 7 for hermetically sealing the rotor 3 and shaft 2 from the driven unit 4. Such tubular portion of the sealing means 7 is constituted by the tubular walls 14 and 21 of an improved can 9 which is or can be made of steel or a similar alloy and is mounted in the pump housing P in such a way that its end wall 13 is adjacent the left-hand end of the shaft 2. The left-hand end portions of tubular walls 14, 21 of the can 9 are connected to the housing P in such a way that the space at the exterior of the can is hermetically sealed from the internal space 70 of the pump proper. A flow 8' of the conveyed fluid medium 8 is diverted from the main stream and is caused to circulate within the can 9 in the direction of arrows Pf1 so as to flow around the driven unit 4 and thereupon through an axial passage of the driven unit back into the central portion of the pumping element or impeller 5. The flow 8' serves to lubricate the bearing or bearings for the driven unit 4. In addition, the flow 8' can be used to heat or cool the driven unit 4, depending upon the temperature of the conveyed fluid medium 8.

The illustrated can 9 includes the aforementioend concentric tubular walls 14 and 21 the common axis of which coincides with or is closely adjacent the axis 20 of the driving and driven units. The right-hand end portion of the inner tubular wall 14 is sealingly connected with the end wall 13 in a manner as shown, for example, in FIG. 4 or 5. The tubular walls 14 and 21 define a very narrow annular space 10 which is preferably filled with a gaseous fluid 11 serving to facilitate monitoring of the condition of the can 9, and more particularly the presence or absence of leaks in the tubular wall 14 and/or 21. The thickness of the outer wall 21 can but need not match the thickness of the inner wall 14. For example, each of these walls can have a thickness of approximately 0.5 mm and the mutual spacing d (which constitutes the radial dimension of the annular space 10) of the walls 14, 21 is preferably very small so that it barely allows for the flow of a gaseous fluid 11 but offers a rather pronounced resistance to the flow of a liquid. The gaseous fluid 11 is admitted by way of a nozzle, nipple or bore 15 which is provided in a support here shown as a flange 19 constituting or connected to the left-hand end portion of the extension 1 of pump housing P. The means for supplying gaseous fluid to the admitting means 15 and hence to the annular space 10 comprises a conduit which contains a pressure monitoring device in the form of a gauge 37. Such gauge can furnish visible signals denoting the pressure in the annular space 10 and/or the gauge can furnish other types of signals which are utilized to shut off the pump motor or to activate an alarm device which produces a visible, audible and/or otherwise detectable signal in the event of one or more leaks in the tubular wall 14 and/or 21 of the can 9. As a rule, the pressure of gaseous fluid 11 in the annular space 10 will slightly exceed the pressure of fluid in the surrounding area.

Figure 2:
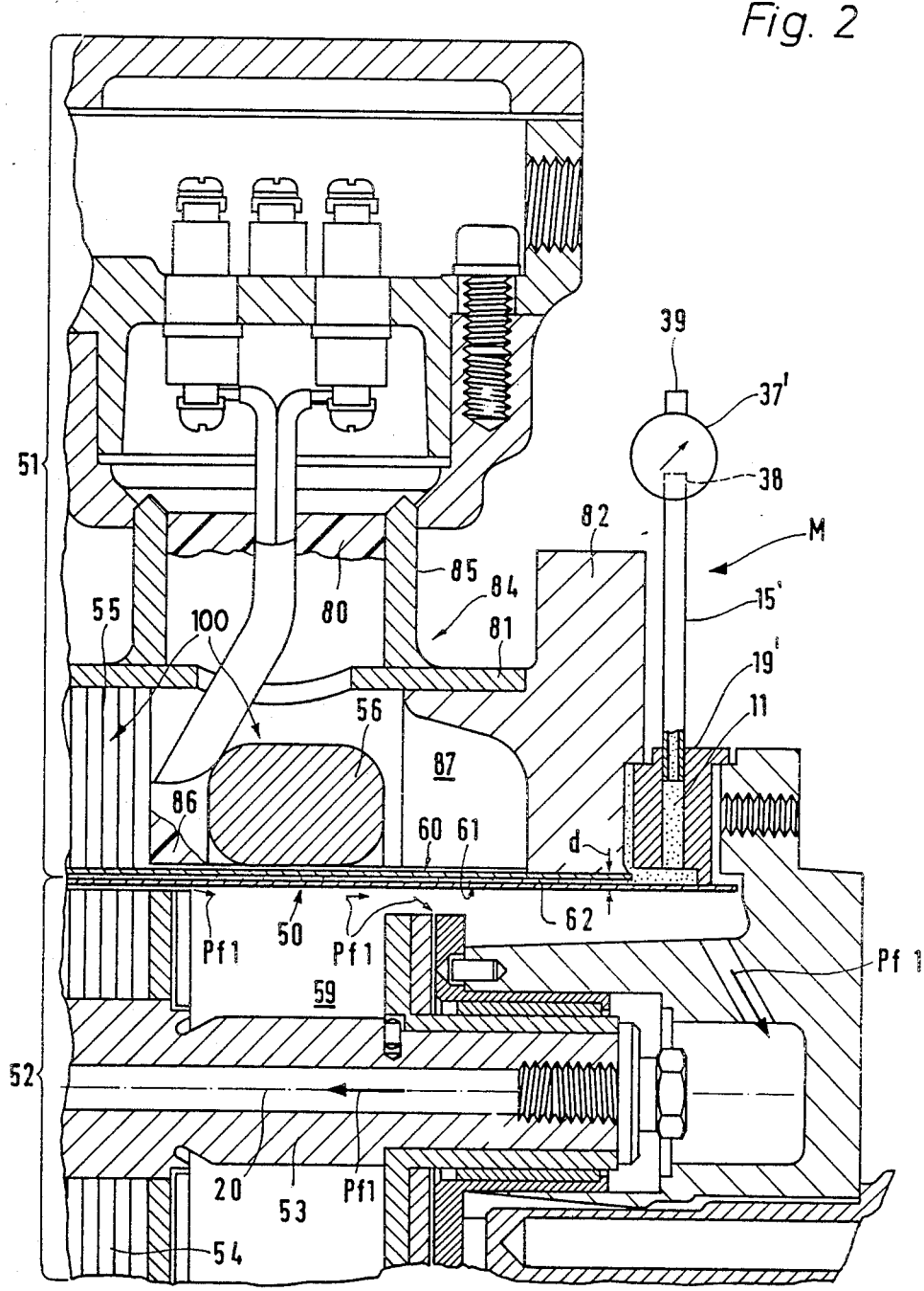
FIG. 2 is a fragmentary axial sectional view of a second pump wherein the pumping element or elements are driven by an electric motor.
Figure 3:
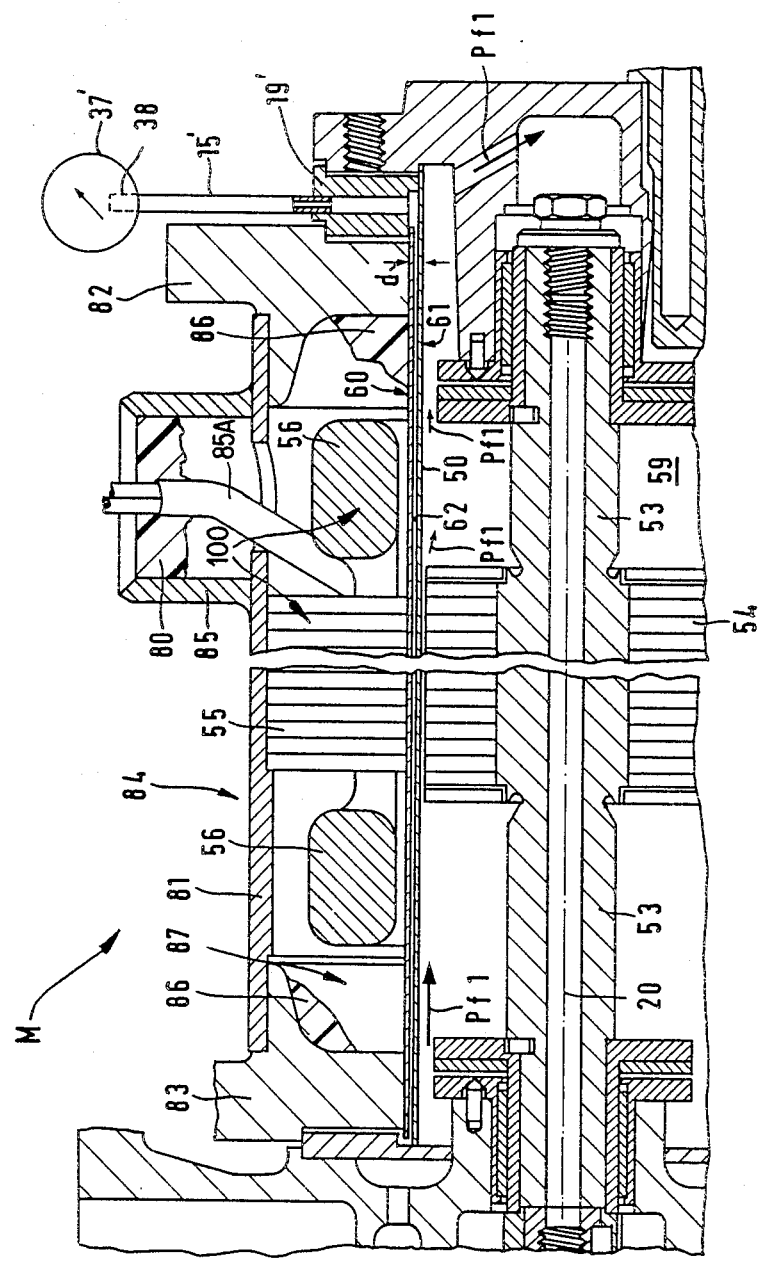
FIG. 3 is a similar fragmentary axial sectional view of a pump which constitutes a modification of the pump shown in FIG. 2.

If desired, the means for monitoring the condition of the walls of the can 9 can include several pressure monitoring devices which are distributed in such a way that they can indicate the progress of pressure in the annular space 10 in order to more accurately point out the locus of a leak in the wall 14 and/or 21. In the embodiment of FIG. 1, the support 19 defines an inlet 16 which is located at the left-hand axial end of the annular space 10 and serves for admission of gaseous fluid 11 from the fluid admitting means 15 into the annular space. As can be seen in FIGS. 2 and 3, it is equally possible to install a fluid admitting means 15' at the right-hand axial end of the improved can. The fluid admitting means 15' of FIG. 2 cooperates with a pressure monitoring device in the form of a gauge 37', with an automatic shutoff device 38 which can arrest the motor of the pump M, and with a signal lamp 39 which can produce a visible signal in response to a pressure change of the gaseous fluid 11 in response to detection of a leak in the inner (61) and-/or outer (60) tubular wall of the respective can 50.

The support 19 of FIG. 1 surrounds the left-hand end portions of the tubular walls 14, 21 and is installed between the extension 1 and the main portion of the pump housing P. The fastener means which sealingly secure the support 19 to the extension 1 and to the main portion of the pump housing P are indicated by horizontal phantom lines.

Fluctuations of gas pressure in the annular space 10 between the tubular walls 14 and 21 of the can 9 will induce the pressure monitoring device 37 to generate appropriate signals which indicate to the attendants that the tubular wall 14 and/or 21 has developed one or more leaks. As a matter of fact, since the operators know the magnitude of pressure within as well as outside of the tubular portion 14+21 of the sealing means 7, they can readily conclude that the leak has developed in the outer wall 21 or in the inner wall 14 of the can 9 by observing the pressure which is indicated by the pointer on the properly calibrated scale of the pressure monitoring device 37. The material and the wall thickness of each of the tubular walls 14, 21 are preferably selected in such a way that, at least for a certain interval of time, the tubular wall 14 or 21 alone can hermetically seal the driven unit 4 from the driving unit 2+3 of the pump motor. This ensures that the operation of the pump S need not be abruptly interrupted in response to detection of a leak, even a minute leak, in the tubular wall 14 or 21.

The gaseous fluid 11 can be replaced with a liquid, for example, with a flow of conveyed fluid medium 8. This is desirable and advantageous if the nature of conveyed fluid medium 8 is such that it should not mix with any other gaseous or liquid substances, even for a short interval of time, in response to development of one or more leaks in the tubular wall 14 and/or 21. The utilization of a gaseous fluid 11 is preferred in many instances because a gaseous fluid can flow through a very narrow annular space 10 so that the mutual spacing of the inner and outer sets of magnets 6 of the magnetic coupling between the driving and driven units of the pump motor can be reduced to a minimum with attendant reduction of losses in transmitted torque. If the fluid 11 is a gas, the combined thickness of the tubular walls 14, 21 plus the radial dimension d of the annular space need not exceed the wall thickness of the single tubular wall of a conventional can.

In order to reinforce the composite tubular wall 14, 21 of the improved can 9, the external surface of the inner wall 14 and/or the internal surface of the outer wall 21 can be provided with suitably distributed protuberances N (see FIG. 4) which extend from the inner wall toward the outer wall and/or from the outer wall toward the inner wall and can come into actual contact with the neighboring wall so as to ensure that relatively thin walls 14 and 21 will be capable of standing the pressures which develop when the improved canned motor pump is in actual use. The protuberances N can constitute welded spots at the outer side of the inner wall 14 and/or at the inner side of the outer wall 21, or any other projections which can be applied in a time- and material-saving manner. The protuberances N can be made of a heat-conducting material so as to ensure that the temperature of the outer wall 21 will not appreciably deviate from the temperature of the inner wall 14 even though such walls are spaced apart from each other, at least when the improved can 9 is intact.

Figure 4:
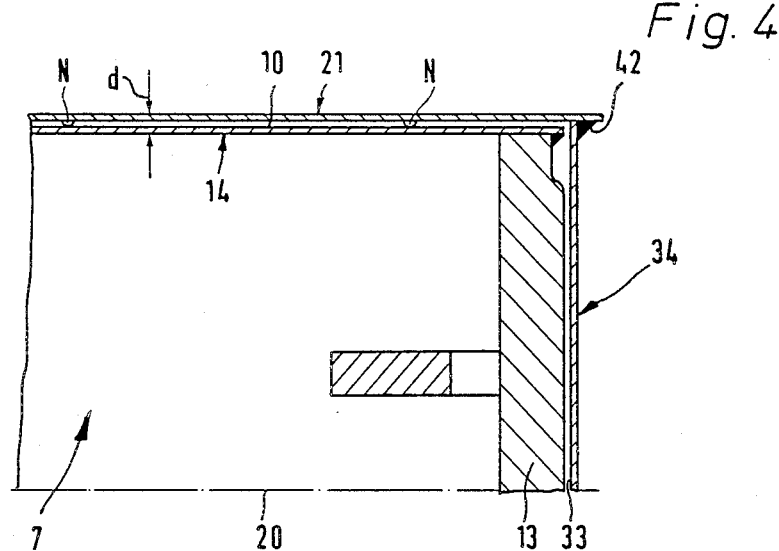
FIG. 4 is a nenlarged fragmentary axial sectional view of a can which can be utilized in the improved pump.

Referring again to FIG. 4, the can 9 which is shown therein has a composite end wall 13 including a relatively thin but preferably rigid outer panel 34 which is mechanically and sealingly secured to the respective end portion of the outer tubular wall 21 by a welded seam 42, and a relatively thick inner panel 31 which is sealingly and mechanically secured to the right-hand end portion of the inner tubular wall 14 by a second annular welded seam. The panels 31 and 34 define a flat space 33 which communicates with the respective end of the annular space 10 in the region of the welded seam 42. This enables the gaseous fluid 11 to flow all around the inner wall 14 and inner panel 31 when the improved pump including the can 9 of FIG. 4 is in actual use. The utilization of a relatively rigid outer panel 34 is preferred at this time in order to relieve the welded seam 42 at the respective end of the outer tubular wall 21. This is particularly important when the tubular walls 14 and 21 of the can 9 are subjected to bending and similar stresses which would be likely to effect a separation of the outer panel 34 from the outer wall 21.

Figure 5:
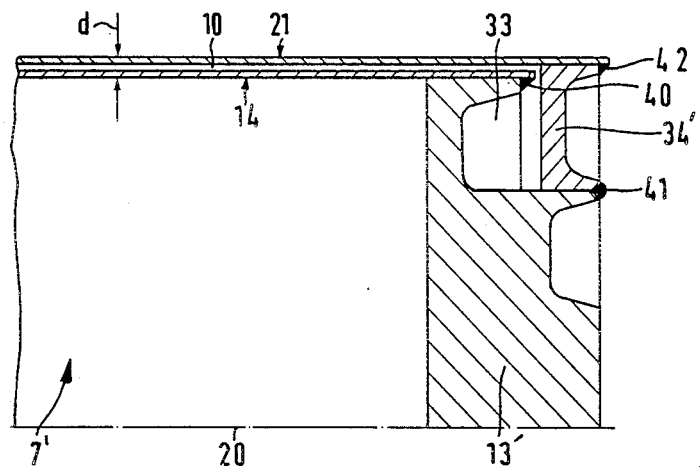
FIG. 5 is a similar fragmentary axial sectional view of a can which constitutes a modification of the can shown in FIG. 4.

FIG. 5 shows a portion of a modified can wherein the end wall 13' includes a panel 31' having its marginal portion sealingly and mechanically secured to the respective end portion of the inner tubular wall 14 by a welded seam 40. The welded seam 40 surrounds an annular groove 33 in the outer side of the panel 31', and such groove receives a rigid ring 34' which is welded to the central portion of the panel 31' at 41 and to the respective end portion of the outer tubular wall 21 of the can by a welded seam 42. The ring 34' reinforces the respective end portion of the outer wall 21. The character d again denotes the radial dimension of the annular space 10 between the tubular walls 14 and 21 of the can 9. The wall thickness W (see FIG. 1) of the outer tubular wall 21 may but need not match the wall thickness of the inner tubular wall 14; as a rule, or at least in many instances, the inner wall 14 will be thinner than the outer wall 21. The structure which is shown in FIG. 5 forms part of a modified sealing means 7' which can be interposed between the driving and driven units of a canned motor pump, for example in lieu of the sealing means 7 shown in FIG. 1.

The ring 34' has outwardly extending inner and outer annular marginal portions constituting lips which are welded to the end portion of the outer tubular wall 21 and to the panel 31' by the respective seams 41 and 42. A similar annular lip is provided on the marginal portion of the relatively thick central part of the panel 31' in the region of the welded seam 41.

An advantage of the structure which is shown in FIG. 5 is that the composite end wall 13' of the can exhibits a very pronounced rigidity and reliably protects the respective end portions of the tubular walls 14 and 21 against undue deformation even in response to very pronounced bending stresses. Moreover, the construction of the composite end wall 13' is simple and the welded seams 40, 41 and 42 can be produced in existing welding machines. Such cans can stand very long periods of use.

FIG. 2 shows a portion of a modified canned motor pump M wherein the motor which transmits torque to the driven unit and to the pumping element or elements (not shown) on the driven unit is an electric motor. This electric motor includes a driving unit 100 which comprises a stator assembly 51 having stator laminations 55 and stator windings 56 (only one shown). The tubular rotor assembly 52 of the electric motor is confined within the stator assembly 51 and includes rotor laminations 54 surrounding a pump shaft 53 having an axis 20 and carrying one or more impellers or otherwise configured pumping elements (not shown). The can 50 of FIG. 2 is installed between the stator assembly 51 and the rotor assembly 52 of the electric motor and includes the aforementioned tubular outer wall 60, the aforementioned tubular inner wall 61 which defines with the outer wall 60 an annular space 62 having a radial dimension d, and an end wall which is not specifically shown in FIG. 2. Such end wall can include a sealing ring between the right-hand end portions of the walls 60, 61. The stator assembly 51 establishes an electric a-c field which is used to rotate the rotor assembly 52 and the impeller or impellers of the canned motor pump M. The space 59 within the inner tubular wall 61 of the can 50 is filled with a flow of diverted conveyed fluid medium which is circulated in directions indicated by arrows Pf1. It will be noted that the shaft 53 has an axial passage wherein the diverted flow is returned into the range of the nearest pumping element or elements of the pump proper. The purpose of such diverted flow of conveyed fluid medium is to cool and/or lubricate the bearing or bearings for the rotor assembly 52.

An important advantage of the twin-walled can 50 which is shown in FIG. 2 is that it establishes a reliable hermetic seal between the stator assembly 51 and the rotor assembly 52 so that even a highly aggressive conveyed fluid medium which is circulated in the direction of arrows Pf1 cannot attack and destroy the stator windings 56 and/or the laminations 55 of the stator assembly 51 in the event of a leak in only one of the tubular walls 60, 61. As mentioned above, the inner and/or the outer tubular wall of the can 50 is preferably designed in such a way that it can stand the pressure and corrosive action of the conveyed fluid medium, at least for a certain interval of time, so that the pump is not immediately destroyed in response to development of a leak in only one of the tubular walls and that a potentially aggressive and highly dangerous conveyed fluid medium cannot escape into the surrounding area to cause ecological problems and/or injury to the attendants and/or damage to other parts of the plant in which the improved canned motor pump M is put to use.

As already described in connection with FIG. 1, the gaseous fluid 11 which is supplied by the fluid admitting means 15' and support 19' fills the annular space 62 between the tubular walls 60, 61 and its characteristics are monitored by the pressure gauge 37'. The gauge 37' and/or the gaseous fluid 11 can activate the shutoff mechanism 38 to arrest the pump motor and/or activate the alarm 39 which produces a visible and/or otherwise readily detectable signal in the event of leakage of at least one of the tubular walls 60, 61.

Figure 15:
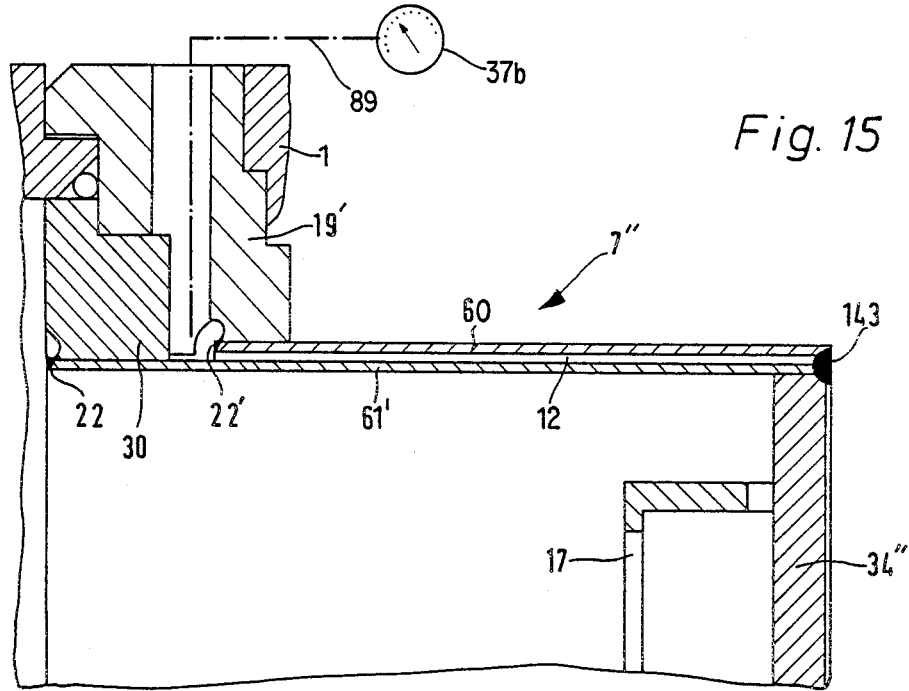
FIG. 15 is a fragmentary axial sectional view of a can which constitutes a modification of the can shown in FIG. 14.

Instead of or in addition to the monitoring means which is shown in FIG. 2, the canned motor pump M (as well as the pump S of FIG. 1) can be equipped with other monitoring means, such as a single generating foil 12 which is shown in FIG. 15 in the annular space between the inner and outer tubular walls of the improved can and constitutes or includes an electrical conductor connected to a measuring instrument 37b by an electric conductor 89. The foil 12 can be made of or can contain a pressure-resistant and/or heat-transmitting material so as to allow for ready transfer of heat between the inner and outer tubular walls as well as to stand deforming stresses in the event of leakage through one and/or other tubular wall. For example, the foil 12 can constitute a grid of a very thin conducting material which is incorporated into a relatively thin layer of tissue or other carrier and cushioning material placed between the inner and outer tubular walls of the can which is shown in FIG. 15.

The canned motor pump M of FIG. 3 is similar to that which is shown in FIG. 2. FIG. 3 shows in greater detail the manner in which a flow of conveyed fluid medium is diverted into the interior of the can 50, and this Figure further shows the details of a safety jacket 84 which is installed around the stator assembly of the electric motor serving to rotate the pump shaft 53 forming part of the rotor assembly which further includes the laminations 54. The safety jacket 84 further reduces the likelihood of escape of a dangerous or highly aggressive conveyed fluid medium into the surrounding area in response to partial or even complete destruction of the can 50. This jacket includes a cylindrical or otherwise configured tubular shell 81 which surrounds the stator assembly including the laminations 55 and windings 56 in the stator chamber 87, a first end wall 83 which is adjacent the left-hand axial end of the shell 81 and is nearer to the pumping element or elements of the pump M, a second end wall 82 which is remote from the pumping element or elements and is disposed at the other axial end of the shell 81, a sleeve-like member 85 which extends radially outwardly from the shell 81 and contains a portion of the electric cable 85A serving to connect the windings 56 with a source of electrical energy, and plastic inserts 80 and 86 which fill the stator chamber 87 around the windings 56 and laminations 55 as well as the sleeve-like member 85 around the cable 85A. The safety jacket 84 constitutes a means for reliably encapsulating the driving unit 100 of the motor which forms part of the pump M. The arrows Pf1 again indicate the direction of flow of diverted fluid medium which lubricates and/or influences the temperature of the rotor assembly of the electric motor in the pump M.

The jacket 84 shields the surrounding area from damage which could be caused by escaping conveyed fluid medium, even in the event of substantial or even total destruction of the can 50. The construction of this can is similar or analogous to that of the can which is shown in FIG. 2. It again comprises a tubular outer wall 60, a tubular inner wall 61, and an annular space 62 which is defined by the walls 60, 61 and receives a supply of gaseous fluid delivered by fluid admitting means 15' extending into a support 19' and containing a pressure monitoring device in the form of a gauge 37'. It goes without saying that the additional safety features including the shutoff device 38 and the alarm device 39 of FIG. 2 can be used with equal or similar advantage in the pump M of FIG. 3. The jacket 84 of FIG. 3 constitutes the third of a set of safety features which prevent escape of circulating flow of diverted fluid medium into the surrounding area. The first safety feature is the inner tubular wall 61, the second safety feature is the outer tubular wall 60, and the third safety feature is the jacket 84 with its shell 81, end walls 82, 83, sleeve-like member 85, and plastic inserts 80 and 86.

As mentioned before, the annular space 10 or 62 between the tubular walls 14, 21 or the can 9 or between the tubular walls 60, 61 of the can 50 can be filled with a gaseous fluid. An additional important advantage of a gaseous fluid in the space 10 or 62 is that gases are less likely to react strongly to a rise of temperature which is expected to develop in response to starting or restarting of the motor of the improved canned motor pump. In other words, a gas does not react as strongly as would a liquid in the space 10 or 62. This ensures that the measurements which are carried out by the monitoring means including a supply of gas in the space 10 or 62 are much more accurate at the time the motor is started than if the space 10 or 62 were filled with a liquid. The integrity or lack of integrity of the tubular walls 14, 21 or 60, 61 can be ascertained by a variety of monitoring devices such as moisture detectors, analyzing instruments, gas detectors or others. It has been found that a pressure gauge is the simplest and perhaps the most accurate means for rapidly ascertaining that characteristic or those characteristics of the fluid in the space 10 or 62 which must be monitored in order to detect the presence or absence of leaks in the tubular wall 14, 21, 60 and/or 61. Pressure gauges are simple, inexpensive, reliable and can be installed in all kinds of paths for the inflow or outflow of fluid into or from the annular space 10 or 62. The provision of a shutoff mechanism 38 for the pump motor and/or of an alarm device, such as the signal lamp 39 of FIG. 2, constitutes an optional feature of the improved monitoring means.

Figure 6:
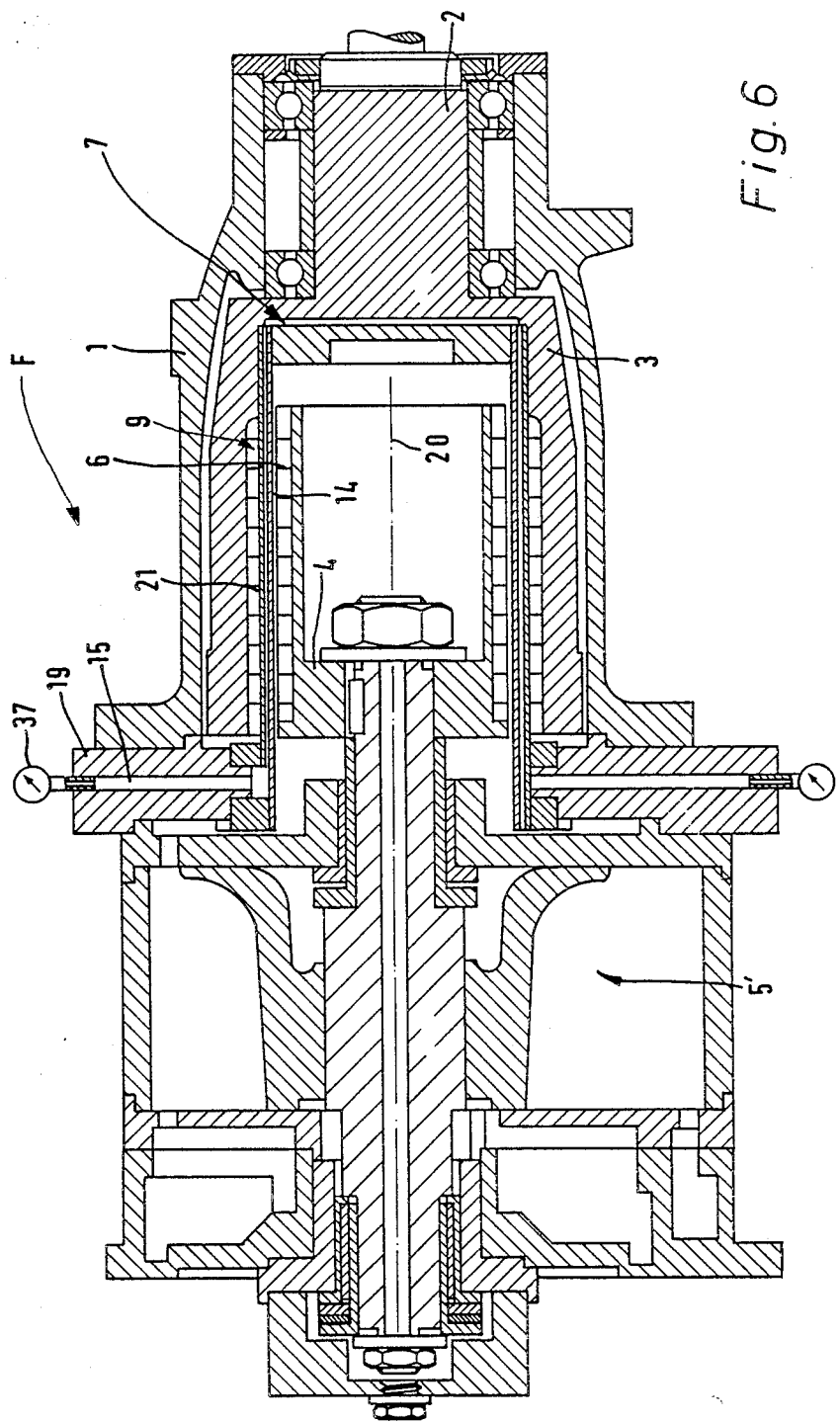
FIG. 6 is a fragmentary axial sectional view of a liquid ring pump which embodies the improved can.

FIG. 6 shows a portion of a so-called liquid ring or water ring pump F which embodies a sealing means 7 employing a can that embodies the present invention. The liquid ring pump F comprises a magnetic coupling with magnets 6 which transmit torque from the driving unit including the shaft 2 and the hollow rotor 3 to the driven unit 4 which rotates a pumping element 5' (called star wheel) of the type customarily employed in liquid ring pumps. Reference may be had, for example to German Pat. No. 29 12 938. Liquid ring pumps are often employed to convey poisonous gases and/or other toxic fluids. The provision of a twin- or multiple-walled can in liquid ring pumps brings about the additional important advantage that the escape of toxic fluids is even less likely than if the liquid ring pump were equipped only with the customary safety devices or with a safety jacket of the type shown at 84 in FIG. 3. The sealing means 7 of FIG. 6 can employ a can with three or even more concentric tubular walls in order to even further reduce the likelihood of escape of toxic fluids from the interior of the can into the surrounding area.

The improved can can be embodied with equal or similar advantage in positive displacement pumps of all kinds.

It has been found that, through the improved can is capable of employing more than two tubular walls or tubes, it normally suffices to provide such can with two concentric tubular walls 14, 21 or 60, 61 defining a single tubular space 10 or 62. This renders it possible to reduce the overall thickness of the tubular part of the can so that such thickness need not appreciably exceed, or does not exceed at all, the thickness of the single tubular wall in a conventional can. Therefore, the improved can need not offer greater resistance to the magnetic torque transmitting forces than a conventioal can with a single tubular wall. In other words, the efficiency of the magnetic coupling or electric motor need not be affected by the fact that the improved can comprises two or even more tubular walls between the driving and driven units of the pump motor. By properly selecting the material of the walls of the can 9 or 50, for example, by employing high-quality nickel alloys with a ferrite percentage of less than 0.5 percent, the efficiency of the magnetic coupling is reduced by a mere few percent in comparison with a coupling which transmits torque through the medium of a can having a single tubular wall. Consequently, the reduction of output of the magnetic coupling or electric motor is well within the range of tolerances or output reserves of such couplings or motors. In the majority of illustrated pumps, the radial dimension d of the annular space 10 or 62 between the tubular walls 14, 21 or 60, 61 of the improved can is exaggerated for the sake of clarity. The same holds true for the thickness W of tubular walls 14, 21, 60 and 61.

FIGS. 7, 8 and 9 illustrate a canned motor pump M' which constitutes a further modification of the canned motor pumps M shown in FIGS. 2 and 3. In other words, this pump M' also employs an electric motor which serves to rotate one or more pumping elements connected to the pump shaft 53 forming part of the driven unit of the pump. The can 50 of the pump M' comprises an outer tubular wall 60 and an inner tubular wall 61'. Such walls define an annular space 62 having a radial dimension d which is exaggerated in FIGS. 7, 8 and 9 for the sake of clarity and is normally barely sufficient to permit a gaseous fluid to flow therethrough. The majority of reference characters which are employed in FIGS. 7-9 (some of these reference characters are followed by primes) are the same or analogous to those used in the preceding Figures.

The left-hand end portion of the inner tubular wall 61' of the can 50 is provided with a radially outwardly extending support in the form of a sealing flange 71 which is mechanically secured to the wall 61' by a ring-shaped welded seam 69. This can be readily seen in the enlarged view of FIG. 8. The other end portion of the inner tubular wall 61' is provided with a radially inwardly extending support in the form of a sealing flange 72. Reference may also be had to the upper portion of FIG. 10. A second welded seam 69 is provided to secure the radially outermost portion of the flange 72 to the respective end of the inner wall 61'.

The left-hand end portion of the pump shaft 53 is rotatable in a plain or friction bearing 64, and the right-hand end portion of this shaft is rotatable in a similar plain or friction bearing 65. The bearing 65 is rotatable in a seat 73 which can but need not form an integral part of a closure 74 forming a separable part of the pump housing P and being secured to the end wall 82 of the safety jacket by a set of axially parallel screws 77 or analogous fasteners. The closure 74 has a stub 63a which surrounds a projection of the seat 73. The flange 72 is sealingly clamped between the seat 73 and the closure 74. The stub 63a is surrounded by a centering shoulder 63b of the closure 74. Additional screws 75 or analogous fasteners are provided to sealingly secure the closure 74 to the seat 73, and such screws can extend through the radially inwardly extending flange 72 at the right-hand side of the inner tubular wall 61' of the can 50. This can be readily seen in FIG. 7. The closure 74 defines a passage constituting an extension of the path defined by the fluid admitting means 15' serving to fill the annular space 62 with a preferably gaseous fluid. A monitoring device in the form of a pressure gauge 37' is provided to indicate the pressure prevailing in the annular space 62 and to thereby indicate the integrity or lack of integrity of the tubular wall 60 and/or 61'.

Figure 10:
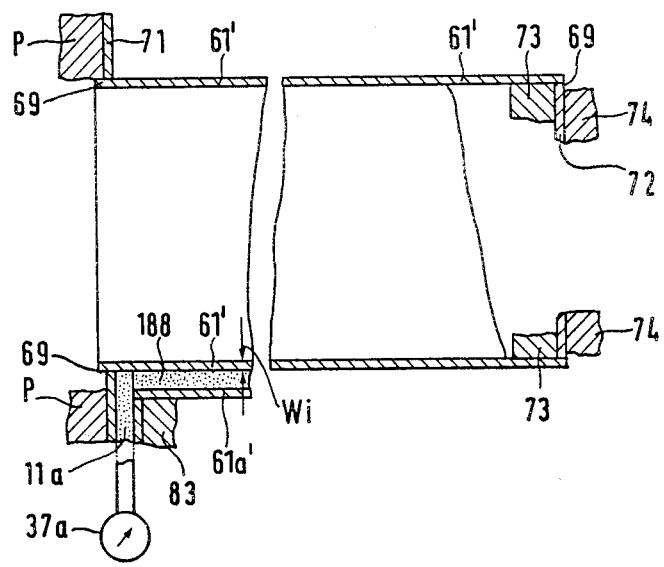
FIG. 10 is a fragmentary axial sectional view of two embodiments of the inner tubular wall of the improved can.
Figure 10A:
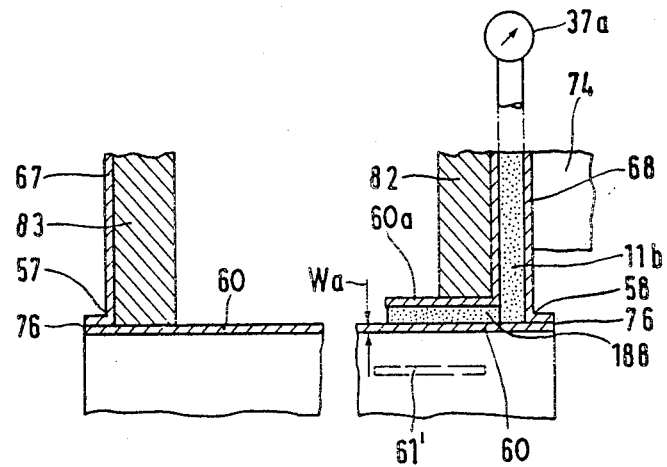
FIG. 10a is a similar fragmentary axial sectional view of two embodiments of the outer tubular wall of the improved can.

The flanges 71, 72 at the respective ends of the inner tubular walls 61' extend substantially radially of the can 50, and the flange 71 is clamped between the main portion of the pump housing P and the adjacent end wall 83 of the safety jacket surrounding the stator including the laminations 55 and the windings 56 shown in FIG. 7. Suitable sealing elements in the form of washers 78 (shown in the left-hand portion of FIG. 7) can be provided adjacent each side of the flange 71 and/or 72 to even further reduce the likelihood of escape of conveyed fluid medium from the pump housing P. The radially innermost portion of the flange 71 has a corrugation 79 which provides space for a ring-shaped welded seam 76 connecting a radially outwardly extending flange 67 to the respective end portion of the outer tubular wall 60 of the can 50. As shown in the left-hand portion of FIG. 10a, the flange 67 at the front end of the outer tubular wall 60 can comprise a short cylindrical portion 57 which surrounds the respective end of the tubular wall 60 and is welded to such tubular wall by the ring-shaped seam 76. A similar sealing flange 68 which, as shown in FIG. 10a, may again comprise a short cylindrical portion surrounding the tubular wall 60, extends radially outwardly from the outer tubular wall 60 at that end of the can 50 which is remote from the pumping element or elements of the pump M'. The provision of cylindrical portions 57, 58 shown in FIG. 10a is optical, i.e., (and as shown in FIG. 10) each radially extending flange can be welded directly or substantially directly to the respective end of the corresponding tubular wall of the can 50 without the provision of any cylindrical portion or portions.

If it is desirable to remove the can 50 from the pump housing P, the screws 77 are removed so as to allow for detachment of the closure 74 from the end wall 82 of the safety jacket. This already allows for detachment of the outer tubular wall 60 with its radially outwardly extending flanges 67, 68 together with the safety jacket including the shell 81, end walls 82, 83 and sleeve-like member 85' as well as with the stator assembly including the laminations 55 and windings 56. The inner tubular wall and the washer or washers 78 can be removed at the same time if the screws 75 are not detached prior to removal of the closure 74. As mentioned above, the screws 75 connect the closure 74 to the seat 73 for the respective plain bearing 65 which surrounds the right-hand end portion of the pump shaft 53. Such removal of the can 50 will take place in response to detection of damage to the inner tubular wall 61' and/or to outer tubular wall 60. The pump M' can be supplied with one or more spare cans 50 which can be installed in lieu of a damaged can so as to restore the pump to operative condition with little loss of time. Such replacement of a damaged can 50 with a fresh can does not necessitate any milling or other material removing operations and/or any welding operations. This is particularly important when the improved canned motor pump is used in countries or regions where skilled labor and/or machinery for carrying out milling, other material removing and/or welding operations with a requisite degree of accuracy and reliability is not always available. As a rule, the welded seams between the flanges and the respective ends of the tubular walls of the can 50, as well as between the tubular walls of the can and the panels of the end wall, must be carried out with a very high or extremely high degree of precision in order to ensure that the can can be used for long periods of time.

FIGS. 7, 8 and 9 show that each half of the outer tubular wall 60 has a substantially U-shaped cross-sectional outline with a tubular part constituting the web and with the radially outwardly extending flanges 67, 68 constituting the legs of the U. Reference may also be had to FIG. 10a which further shows the aforementioned short cylindrical portions 57, 58 of the radially extending flanges 67, 68 and two welded seams 76 which connect the cylindrical portions 57, 58 to the respective ends of the central tubular part of the wall 60.

As mentioned above, the thickness of the tubular walls 14, 21 or 60, 61 or 60, 61' may but need not be the same. This depends upon the nature of the canned motor pump, namely whether the pump employs an electric motor or a set of magnets 6 as a means for transmitting torque from the driving unit to the driven unit. Furthermore, the thickness of the inner and outer tubular walls of the can 9 or 50 will depend upon the intended utilization of the canned motor pump and on the nature of the conveyed fluid medium. If the motor of the improved pump is an electric motor, the thickness $W_a$ of the outer tubular wall 60 (FIG. 10a) is preferably selected in such a way that the outer tubular wall can stand the pressure of conveyed fluid medium when the pump M or M' is in actual use and the inner tubular wall 61 or 61' develops one or more leaks. Under normal operating conditions, the thickness $W_a$ of the outer tubular wall 60 need not exceed 0.5 mm. At least in most instances, it is not necessary that the outer tubular wall 60 of the pump M or M' be separable from the inner tubular wall 61 or 61'. The reason is that the outer tubular wall 60 is much less likely to be damaged than the other components of the improved can. If necessary, and as explained above in connection with FIGS. 7–9, the outer tubular wall 60 can be replaced jointly with the stator including the laminations 55, windings 56 and jacket including the parts 81, 82, 83, 85 and 80, 86.

In many instances, the wall thickness $W_i$ (See FIG. 10) of the inner tubular wall 61 or 61' of a pump M or M' can be a small or minute fraction of the wall thickness $W_a$ of the outer tubular wall 60. It normally suffices to select the wall thickness $W_i$ in such a way that the inner tubular wall 61 or 61' can stand, at least for a certain period of time, the pressure of the conveyed fluid medium without any or without appreciable deformation. Among the potential causes of damage to the inner tubular wall 61 or 61' are the plain bearings 64, 65 for the pump shaft 53. As described in connection with FIGS. 7–9 and 10, the inner tubular wall 61' can be readily replaced with a fresh inner tubular wall without carrying out any milling and/or welding operations.

In the embodiment of FIGS. 7, 8 and 9, the radially inwardly extending flange 72 of the inner tubular wall 61' is clamped between the seat 73 for the plain bearing 65 and the closure 74 by screws 75. Suitable washers (not specifically shown and corresponding to the washer 78 of FIG. 8) can be installed at each side of the flange 72. This even further reduces the likelihood of leakage of conveyed fluid medium in the region between the seat 73 and the closure 74. As a rule, the washer or washers will be extremely thin or very thin.

The radially outwardly extending flange 68 of the outer tubular wall 60 is clamped between the end wall 82 and the closure 74 by the screws 77. The aforementioned washers can also be installed at each side of the flange 68. The same applies for the flanges 67 and 71 at the left-hand ends of the tubular walls 60 and 61' of the pump M' shown in FIGS. 7–9. The aforementioned corrugation 79 at the radially inner end of the flange 78 which is connected to the left-hand end of the inner tubular wall 61' by the welded seam 69 serves the additional purpose of enabling the can 50 to compensate for eventual manufacturing tolerances. If desired or necessary, a similar corrugation can be provided at the radially inner end of the flange 67 which is secured to the left-hand end of the outer tubular wall 60 by the welded seam 76. Such design of the can 50 ensures that the can can yield slightly in the axial direction or that its length can be increased in the axial direction without actually deforming the tubular walls 60 and 61'.

Figures 11, 12:
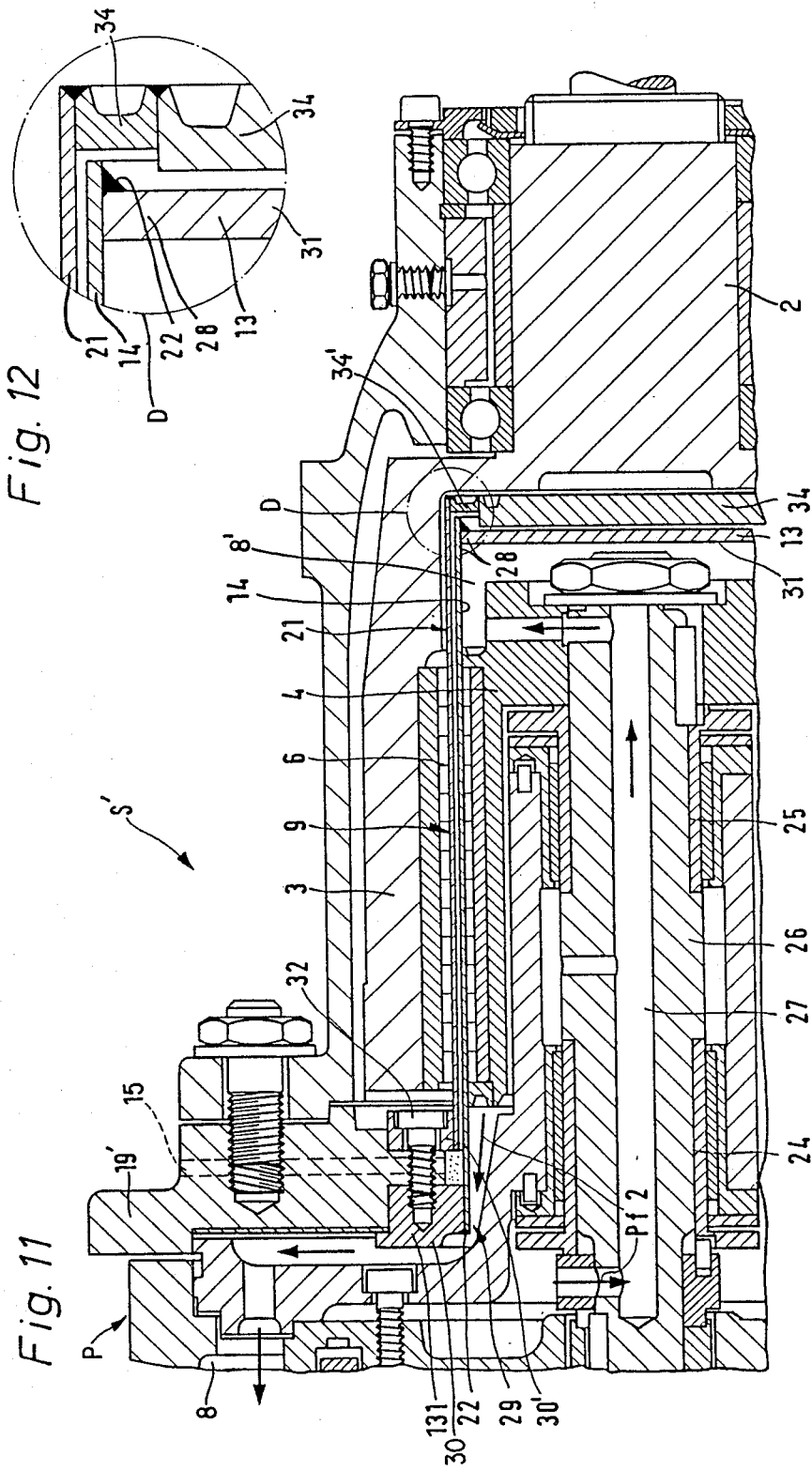
FIG. 11 is a fragmentary axial sectional view of a canned motor pump which constitutes a modification of the pump shown in FIG. 1.
FIG. 12 is an enlarged view of a detail within the phantom-line circle D in FIG. 11.

FIG. 11 shows a portion of a modified canned motor pump S' which employs a magnetic coupling including two sets of magnets 6 for transmission of torque from the driving unit including the shaft 2 and the rotor 3 to the driven unit 4 including the pump shaft 26 which carries one or more pumping elements in the form of impellers or the like. The pump shaft 26 is rotatable in plain or friction bearings 24 and 25. The bearing 24 is mounted in a sleeve of the pump housing P. The impellers may be similar to the impeller 5 which is shown in the left-hand portion of FIG. 1. The pump shaft 26 has an axial bore 27 which serves to convey a diverted flow 8' of conveyed fluid medium 8 into the interior of the can 9, the flow 8' being returned into the main body of conveyed fluid medium 8 by flowing in the directions which are indicated by arrows Pf2. The diverted flow 8' serves to lubricate and/or cool the parts of the driven unit 4. The can 9 of the sealing means shown in FIG. 11 is similar to the can 9 of FIG. 1. The construction of the composite end wall 13 of the can 9 deviates slightly from that shown in FIG. 5 in that the end wall 13 of FIG. 11 comprises an outer panel 34 and an inner panel 31 as well as a ring 34'. This can be readily seen in FIG. 12.

An advantage of the pump S' which is shown in FIGS. 11 and 12 is that the inner tubular wall 14 of the can 9 can be removed from the pump housing P including the extension 1 without necessitating the destruction of any welded seams. Such removal can be carried out upon completed removal of the outer tubular wall 21. As shown in FIG. 12, the inner panel 31 of the composite end wall 13 is welded at 22 to the inner tubular wall 14, and the ring 34' is welded to the outer panel 34 as well as to the respective end of the outer tubular wall 21. The reference character 28 denotes a component which includes the inner tubular wall 14 and the inner panel 31 of the composite end wall 13, and such component can be said to constitute a rudimentary can which is capable, by itself, of preventing the outflow of conveyed fluid medium from the interior of the can 9 into the area surrounding the extension 1 of the pump housing P.

The left-hand end 29 of the can 9 which is shown in FIG. 11 is provided with a radially outwardly extending support or flange 30 which is welded to the respective end of the inner tubular wall 14 by a seam 22. The flange 30 is received in a complementary recess 131 of a support 19' forming a separable or integral part of the pump housing P. The means for separably securing the flange 30 to the support 19' includes screws 32 or analogous fasteners. A flange 30' is welded to the left-hand end of the outer tubular wall 21.

Figure 13:
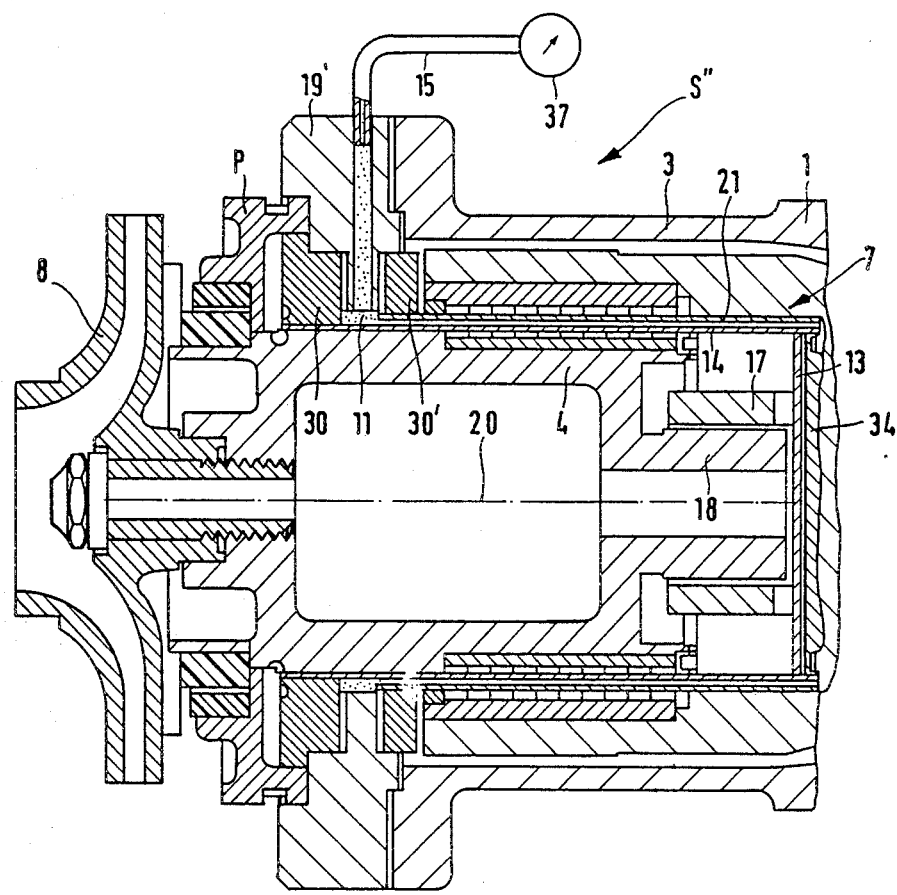
FIG. 13 is a fragmentary axial sectional view of another modification of the canned motor pump of FIG. 1.

FIG. 13 shows a canned motor pump S" which constitutes a second modification of the pump S shown in FIG. 1. The left-hand end of the inner tubular wall 14 again carries a radially outwardly extending flange 30 which is secured thereto by a welded seam 22, and the left-hand of the outer tubular wall 21 carries a second flange 30' which is secured thereto by a welded seam 22'. The flanges 30 and 30' flank a radially inwardly extending portion of the support 19' which constitutes a separable portion of the pump housing P. The support 19' is further connected with a tubular fluid admitting component 15 which is provided with a monitoring device 37 in the form of a gauge serving to indicate the pressure in the annular space 10 between the tubular walls 14 and 21 of the can shown in FIG. 13. The flanges 30 and 30' are separably secured to the support 19'. Such mounting of the flanges 30 and 30' renders it possible to detach the outer tubular wall 21 independently of the inner tubular wall 14 and/or vice versa. The construction of the composite end wall 13 of the can which is shown in FIG. 13 is preferably the same as described in connection with FIGS. 11 and 12, namely the composite end wall comprises an inner panel which is sealingly secured only to the respective end of the inner tube 14 and an outer panel which is sealingly secured only to the respective end of the outer tubular wall 21.

Figure 14:
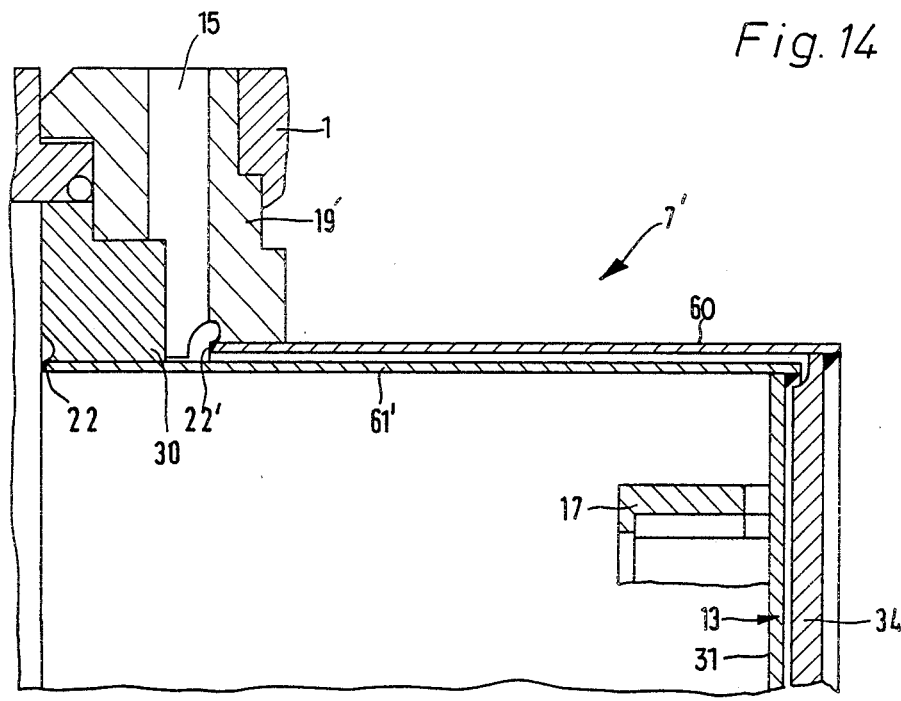
FIG. 14 is a fragmentary axial sectional view of a further can which can be used in the improved canned motor pump.

FIG. 13 further shows an auxiliary bearing 17 for the respective end portion or stub 18 of the driven unit 4 within the confines of the can. The auxiliary bearing 17 can be an integral part of the inner panel of the composite end wall 13 of the can. Reference may be had also to FIG. 14 which shows the details of the a can forming part of a modified sealing means 7'. The embodiment of FIG. 14 differs from the embodiment of FIG. 13 only in that the welded seam 22' connects the left-hand end of the tubular wall 21 or 60 directly to the support 19'. The inner tubular wall 14 or 61' is welded to the flange 30 at 22. The auxiliary bearing 17 is an integral part of the inner panel 31 of the composite end wall 13, and such inner panel is further secured only to the inner tubular wall 14 or 61'. On the other hand, the outer panel 34 is secured only to the respective end of the outer tubular wall 21 or 60. The outer tubular wall 21 or 60 can be removed jointly with the support 19' and the rigid outer panel 34 of the composite end wall 13. Upon such removal of the outer tubular wall 21 or 60, the inner tubular wall 14 or 61' can be removed together with the flange 30 and the inner panel 31 of the composite end wall 13.

FIG. 15 shows a portion of a modified sealing means 7'' which includes a can having an outer tubular wall 21 or 60 and an inner tubular wall 14 or 61'. The annular space between the wall 14, 21 or 60, 61' accommodates the aforementioned signal generating foil 12, and the end wall comprises a single rigid panel 34'' which carries an integral auxiliary bearing 17. The marginal portion of the rigid panel 34'' is welded to the respective ends of the tubular walls 14, 21 or 60, 61' by a welded seam 143. In other words, the can of the sealing means 7'' shown in FIG. 15 is a unitary, one-piece body including the inner and outer tubular walls, the auxiliary bearing 17 and the single panel 34'' of the end wall. The left-hand ends of the tubular walls 14, 21 or 60, 61' shown in FIG. 15 can be secured to the pump housing in a manner as shown in FIG. 13 or 14. In other words, each of the tubular walls can be connected to a separate flange (30, 30') or the inner tubular wall 14 or 61' can be connected to a flange 30 whereas the outer tubular wall 21 or 60 is welded directly to the support 19 or 19' of the housing P.

An advantage of the construction which is shown in FIG. 15 is that the can of the sealing means 7'' can stand substantial bending and other stresses without any or without appreciable deformation. This ensures that the position of the auxiliary bearing 17 on the panel 34'' of the end wall of the can does not change at all.

It has been found that, if a conventional can having a tubular wall with a thickness of approximately 1 mm is replaced with a novel can having at least two tubular walls each with a wall thickness of 0.5 mm, the resistance which the improved can offers to the magnetic torque-transmitting forces between the driving and driven units of the canned motor pump is not much higher than in a conventional pump. The thickness of at least one of the tubular walls 14, 21 or 60, 61 or 60, 61' will be increased or can be increased, at least slightly, if the conveyed fluid medium is maintained at an elevated or very high pressure. In order to avoid excessive losses in the magnetic forces which drive the unit 4, it is advisable to increase only the thickness of one of the tubular walls and only to a minimum extent which still suffices to ensure that the respective wall will be capable of standing the elevated pressures of conveyed fluid medium. For example, if the pressure of conveyed fluid medium is very high, the thickness of the outer tubular wall 21 or 60 can be increased to 1, 3, 5 or even 7 mm while the thickness of the inner tubular wall 14, 61 or 61' remains within 0.3–0.5 mm. If the inner tubular wall having a thickness of 0.3 to 0.5 mm develops one or more leaks, the outer tubular wall 21 or 60 still ensures that the driving and driven components of the pump are hermetically sealed from each other. If the normally thicker outer tubular wall 21 or 60 is destroyed prior to damage to the inner tubular wall 14 or 61 or 61', the preferably elastic inner tubular wall can be deformed by pressurized fluid medium so that it leans against the outer tubular wall and thereby seals eventual leaks in the outer tubular wall so that the improved pump continues to prevent escape of conveyed fluid medium from the interior of the multiple-walled can into the surrounding area. Such elastic deformation of the relatively thin inner tubular wall will take place if the outer tubular wall develops one or more relatively small leaks but is still rigid enough to adequately support the elastically expanded or deformed inner tubular wall so that the damaged outer tubular wall cooperates with the elastically deformable inner tubular wall to jointly form a composite tubular wall which is capable of preventing leakage of conveyed fluid medium into the area surrounding the outer tubular wall. At such time, the monitoring means (which can include a supply of gaseous fluid 11 in the annular space between the inner and outer tubular walls) already generates a signal which can be used to directly or indirectly effect immediate stoppage of the pump motor so as to avoid further damage to the pump and/or eventual escape of conveyed fluid medium into the surrounding area.

The lower left-hand corner of FIG. 10 shows that at least one of the tubular walls can be assembled of several tubular sections so that the can including such tubular wall actually comprises more than two tubular walls. The inner tubular wall shown in the lower left-hand corner of FIG. 10 includes an inner tubular section 61' and an outer tubular section 61a'. The sections 61', 61a' define an annular space 188 which can receive a gaseous fluid 11a by way of a conduit which contains a pressure monitoring device 37a in the form of a gauge or the like. The gauge indicates the pressure in the annular space 188 and can be used as a means for transmitting signals which effect a stoppage of the pump motor and/or the generation of a visible and/or audible signal by a suitable alarm device corresponding to the alarm device 39 shown in FIG. 2.

The upper right-hand portion of FIG. 10a shows that the outer tubular wall of the improved can may also comprise two concentric tubular sections 60, 60a with an annular space 188 between them. The space 188 can be filled with a gaseous or liquid fluid 11b which is supplied by a conduit containing a pressure monitoring device in the form of a gauge 37a. This gauge can be used to generate visible and/or audible or other readily detectable signals as well as to generate signals which are used to automatically stop the pump motor when the section 60 or 60a of the outer tubular wall develops a leak.

As mentioned above, the fluid in the annular space 10, 62 or 188 can be a gas or a liquid. However, if it is desired to avoid a mixing of conveyed fluid medium 8 with any other fluid, be it a gas or a liquid, a flow of the conveyed fluid medium can be diverted into the annular space 10, 62 or 188 so as to positively prevent any contamination of the conveyed fluid medium.

Figure 16:
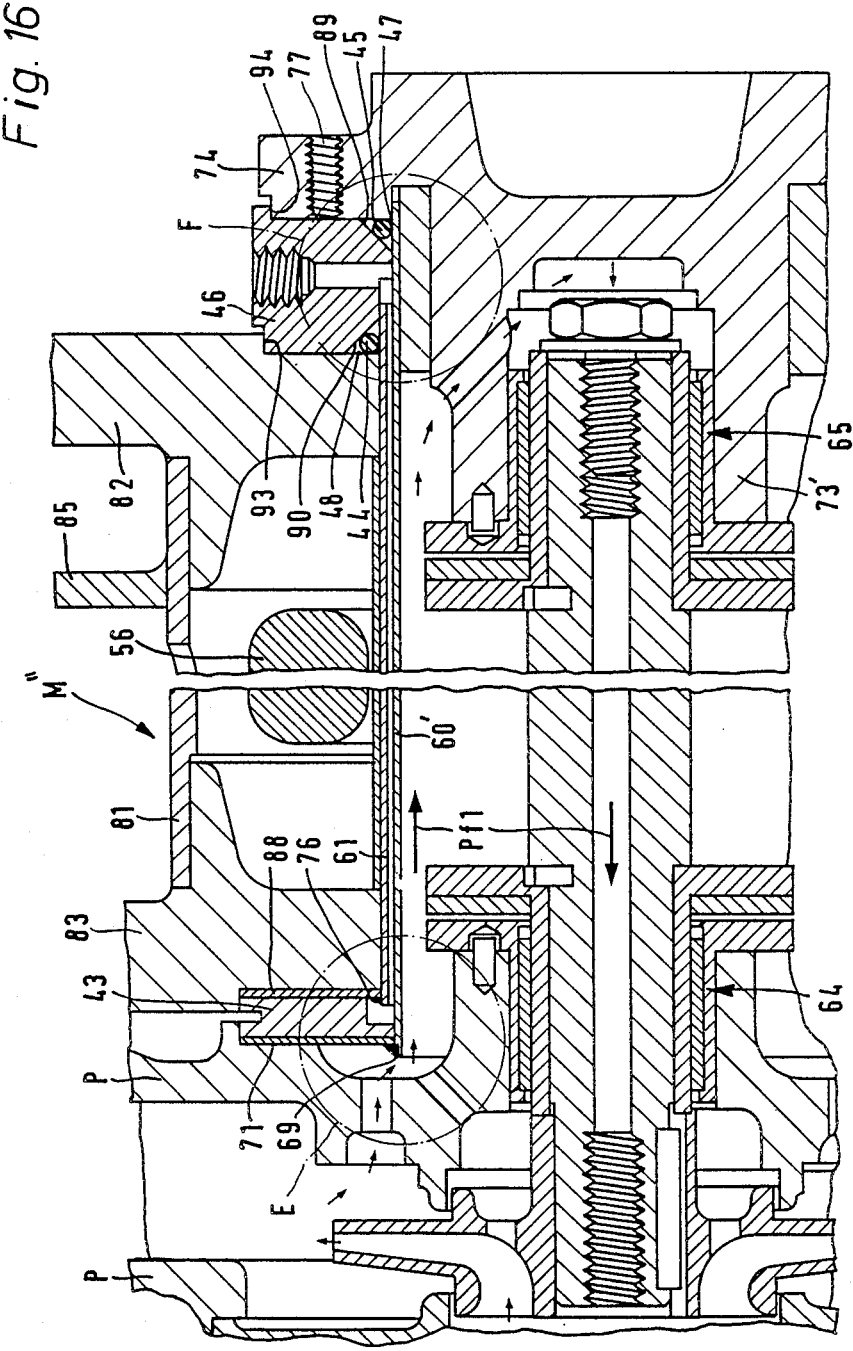
FIG. 16 is a fragmentary axial sectional view of a canned motor pump which constitutes an additional modification of the pump shown in FIG. 2.
Figure 17:
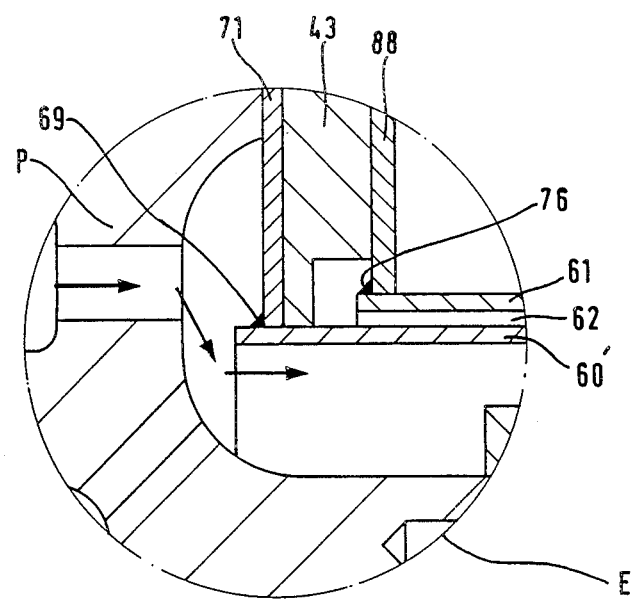
FIG. 17 is an enlarged view of a detail within the phantom-line circle E of FIG. 16.
Figure 18:
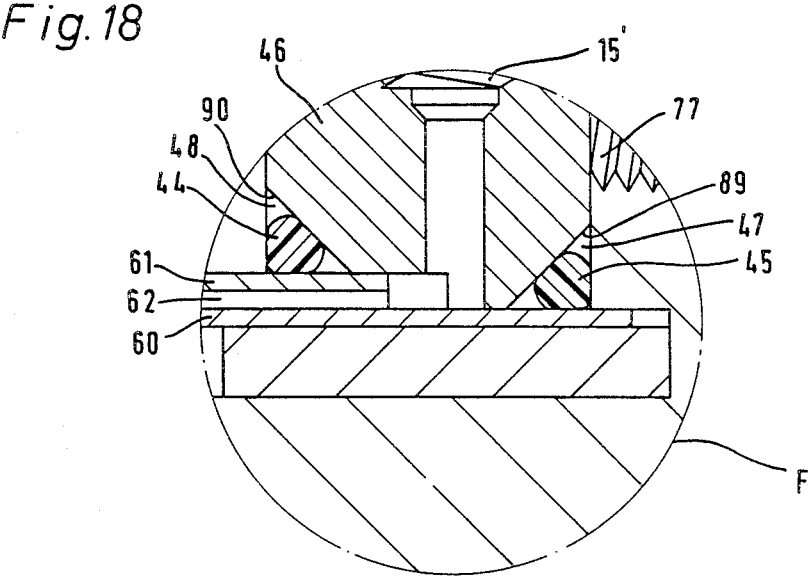
FIG. 18 is an enlarged view of a detail within the phantom-line circle F of FIG. 16.

FIGS. 16, 17 and 18 show a portion of a further canned motor pump M'' which constitutes an additional modification of the pump shown in FIG. 2. All such parts which are identical with or clearly analogous to the corresponding parts of the previously described pumps are denoted by similar reference characters. The laminations 55 of the stator assembly and the laminations 54 of the rotor assembly of the electric motor of the pump M'' are omitted in FIGS. 16–18 for the sake of clarity. The left-hand end portion of the inner tubular wall 61' of the can 50 carries a radially outwardly extending sealing flange 71 at one side of a flange-like support 43 constituting a detachable part of the pump housing P. The other side of the support 43 is adjacent a radially outwardly extending flange 88 which is secured to the respective end of the outer tubular wall 60 of the can 50 by a welded seam 76. The means for mechanically connecting the flange 71 to the respective end of the inner tubular wall 61' constitutes a welded seam 69. Screws (not specifically shown) or other suitable fasteners are provided to clamp the flanges 71, 88 and support 43 between the end wall 83 of the safety jacket and the main portion of the pump housing P in a manner best shown in FIG. 17. This ensures that no leakage can take place at the left hand end of the annular space 62 between the tubular walls 60 and 61" of the can 50.

As shown in FIG. 18, the right-hand end portions of the tubular walls 60 and 61' are not provided with any welded flanges. Instead, the flange-like support 46 for such end portions of the tubular walls 60 and 61' has a stepped bore so that a portion thereof abuts the external surface of the outer tube 60 and another portion thereof abuts the external surface of the inner tube 61'. Such portions of the support 46 are chamfered at 90 and 89 to provide annular spaces for sealing elements 44 and 45 which sealingly engage the support 46 as well as the external surfaces of the respective tubular walls and thus establish a reliable sealing action at both sides of the fluid admitting means 15' which communicates with the annular space between the tubular walls 60 and 61'. The annular spaces for the sealing elements 44 and 45 are respectively shown at 48 and 47. The support 46 is a ring-shaped body which is disposed between the closure 74 and the end wall 82 of the safety jacket of the housing of the pump M".

An advantage of the can 50 which is shown in FIGS. 16–18 is that each of the tubular walls 60, 61' can be removed with the respective flange 88, 71 without the need for any material removing operation. Moreover, it is not necessary to carry out a welding operation in order to install a fresh outer tubular wall 60 or a fresh inner tubular wall 61'.

As can be seen in FIG. 16, the flanges 71 and 88 are disposed at that end of the can 50 which is nearer to the pumping element or pumping elements 5. However, it is equally within the purview of the invention to place the flange-like support 46 next to the main body of the pump housing P and to provide the flanges 71 and 88 at the right-hand ends of the tubular walls 61' and 60. The construction which is shown in FIG. 16 is preferred at this time because it simplifies the assembly and dismantling of the can 50.

The admitting means 15' in the support 46 can supply a gaseous fluid which fills the annular space 62 between the tubular walls 60 and 61'. The arrangement may be such that the pressure of gas in the space 62 is below atmospheric pressure or below the pressure in the surrounding area. The width or radial dimension of the annular space 62 can be selected in such a way that the space affords room for the flow of a gaseous fluid but that it interferes with or prevents the flow of a liquid medium. If the pump M, M' or M" maintains the conveyed fluid medium 8 at an elevated pressure, the monitoring means including the pressure gauge or gauges can operate in the following way: If the gauge indicates a slight rise of pressure in the annular space 62 above a standard pressure, this indicates the presence of a leak in the outer tubular wall 60. If the gauge indicates a substantial rise of pressure in the annular space 62, this normally indicates the presence of one or more leaks in the inner tbular wall 61 or 61'.

For the sake of safety, it is desirable to fill the annular space 10 or 62 or 188 with a fluid which is not likely to react with the conveyed fluid medium 8. If this is not possible or if it is absolutely necessary or highly desirable to prevent any contact between the conveyed fluid medium 8 and the fluid 11 or 11a or 11b which fills the annular space 10, 62 or 188, the annular space can be filled with the fluid medium which is being conveyed by the impeller or impellers of the improved pump. This is especially desirable when the inner tubular wall 14, 61 or 61' develops a leak because the leak enables the conveyed fluid medium to penetrate into the annular space between the tubular walls or enables the fluid in such annular space to penetrate into the fluid medium filling the interior of the can 9 or 50. The outer tubular wall then continues to establish a hermetic seal between the driving and driven units of the pump motor. The fluid which is confined in the annular space between the tubular walls of the improved can can be maintained at an initial pressure such that any deviations of actual pressure in the annular space from the initial or standard pressure will enable the attendants or an automatic evaluating system to ascertain whether the leak is in the inner or in the outer tubular wall regardless of whether the fluid in the annular space is maintained at a pressure above or below the pressure prevailing in the surrounding area. The monitoring means including the fluid in the annular space between he tubular walls of the improved can is capable of reacting practically instantaneously so that the motor of the pump can be turned off without any delay or the attendants receive a warning signal practically instantaneously when at least one of the tubular walls develops a leak. Of course, such monitoring means also generates appropriate signals in response to development of one or more leaks in the welded seams and/or in the components of the end wall of the improved can. As mentioned above, immediate detection of one or more leaks is particularly desirable and important when the pump is to convey a toxic or otherwise highly damaging, noxious or dangerous fluid medium.

An advantage of the pump M" of FIGS. 16–18 is that it can adequately and highly accurately center the closure 74 relative to the flange-like support 46 as well as that it can adequately center the seat 73' for the plain bearing 65 relative to the support 46 in addition to adequately centering the support 46 relative to the end wall 82 of the safety jacket. The end wall 82 has a centering shoulder 93 for the adjacent portion of the support 46, and the support 46 has a centering shoulder 94 for the closure 74. The seat 73' constitutes an integral part of the closure 74. Adequate centering of the right-hand end portion of the pump shaft 53 in the plain bearing 65 ensures adequate centering of the shaft 53 in the plain bearing 64 and thereby reduces the likelihood of wobbling of the driven unit with attendant prolongation of the useful life of the can 50 and of the entire canned motor pump.

The feature that the flange-like support 46 need not be welded to the respective ends of the tubular walls 60, 61' which are shown in FIGS. 16–18 is desirable and advantageous because it enables the tubular walls to move (if necessary) axially without any bending or other undesirable deformations which could affect the useful life of the can 50. In other words, the right-hand end portions of the tubular walls 60 and 61' can readily slide relative to the respective portions of the support 46 without affecting the sealing action of the elements 44 and 45.

All embodiments of the improved pump exhibit the advantage that the monitoring means can generate a suitable signal or shut off the pump motor before the hermetic seal between the driving and driven units of the pump motor is destroyed. This positively prevents leakage of potentially dangerous conveyed fluid media into the surrounding area. The quality of the hermetic seal between the driving and driven components of the pump motor can be enhanced still further by increasing the number of tubular walls, for example, in a manner as shown in FIGS. 10 and 10a wherein the inner tubular wall or the outer tubular wall comprises a plurality of concentric tubular sections with additional annular spaces between them so as to increase the number of possibilities to readily detect the presence of a leak and to arrest the pump motor and/or to generate a readily detectable signal in good time prior to penetration of the conveyed fluid medium into the surrounding area.

Another important advantage of the improved pump is that the monitoring means can generate signals in good time even before the integrity of the hermetic seal is affected to such an extent that at least some of the conveyed fluid medium could penetrate into the surrounding area. Thus, while the improved can enhances the safety of the pump by ensuring that leakage of one tubular wall will not immediately result in escape of a potentially harmful or dangerous conveyed fluid medium, the monitoring means ensures that the operators are warned in time or that the pump motor is shut off in time before irreparable damage occurs, for example, as a result of extension destruction of the components of the canned motor pump by the conveyed fluid medium and/or as a result of actual escape of the fluid medium from the pump housing. One of those safety features complements the other, and vice versa. If the pump motor is shut off in time, the improved canned motor pump can confine a dangerous fluid medium for practically unlimited periods of time in spite of eventual damage to one of several walls of the can.

The decision to employ a gaseous fluid in the internal space or spaces of the composite tubular wall and to maintain such fluid at an elevated pressure or at a pressure which is below the pressure in the surrounding area will depend on the dimensions of the annular space or spaces, on the nature of the gaseous flud, and on certain other parameters. The utilization of a gaseous fluid is preferred because such fluid can readily fill all parts of the internal space in the can so that it can immediately react (by increasing or reducing its pressure) to the development of leaks at any point of the can. For example, if the fluid in the annular space or spaces of the can is maintained at an elevated pressure, any (even slight) drop of pressure will be indicated by the respective gauge or gauges so that a signal can be generated in good time before the damage spreads to such an extent that any repair of the pump involves substantial costs or that the pump is damaged beyond repair. As mentioned before, the utilization of a gaseous fluid is preferred on the additional ground that this renders it possible to reduce the radial dimension d of the annular space between two neighboring tubular walls so that the combined radial dimension of the tubular walls plus the radial dimension of the annular space between them can be kept to a minimum which ensures that the magnitude of magnetic torque-transmitting forces is not unduly reduced as a result of utilization of the improved can. The placing of tubular walls into immediate or close proximity of each other (and, if necessary, the provision of the aforementioned protuberances N) ensures that the transfer of heat between such tubular walls is unimpeded or is only slightly impeded. Rapid transmission of heat from the outer tubular wall to the inner tubular wall and thence to the fluid medium which is confined in the interior of the can is often desirable and advantageous if the viscosity of the fluid medium tends to increase during an interval of idleness of the canned motor pump. Moreover, the outer tubular wall is normally heated more intensively than the inner tubular wall due to the presence of eddy currents which develop when the driving unit transmits torque to the driven unit. Heat which is generated as a result of the development of eddy currents is transmitted to the fluid medium in the interior of the can and is carried away to avoid an overheating of the can.

It has been found that a monitoring means employing a supply of gaseous fluid operates quite satisfactorily if the pressure of gaseous fluid in the annular space or spaces of the can is at least slightly above atmospheric pressure, provided that the pressure around the can equals or approximates atmospheric pressure. Thus, if the outer tube develops a leak, the pressure of confined gaseous fluid in the annular space drops immediately so that the drop of pressure can be registered by the gauge which indicates that the outer tubular wall has developed a leak. If the pressure of the confined gaseous fluid rises above the normal pressure, this indicates the presence of a leak in the inner tubular wall because the pressure of conveyed fluid medium in the interior of the can is normally higher than the pressure in the annular space or spaces.

The improved can will resemble a pot or cut with an end wall especially if the means for transmitting torque between the driving and driven units of the pump motor includes a magnetic clutch. As mentioned above, the end wall of the can can include a single panel which is welded or otherwise mechanically secured to both or all tubular walls, or a plurality of panels each of which can be sealingly secured to a discrete tubular wall of the can. An advantage of a composite end wall which also defines at least one space in communication with the annular space or spaces between the tubular walls of the improved can is that the monitoring means is capable of detecting and indicating the presence of leaks in the region of the end wall. This is especially important when the end wall of the can is closely or immediately adjacent the closed end of the rotor 3 of the driving unit 2, 3 in a canned motor pump wherein the motor includes a magnetic coupling. Eventual contact between the rotor 3 and the adjacent portion or portions of the end wall of the can often results in damage to the end wall, especially if the conveyed fluid medium carries solid impurities which rub against the end wall of the can and can cause damage which is detectable if the end wall defines at least one space that is filled with a gaseous or other fluid so that the drop or rise of pressure in the interior of the composite end wall can be detected by one or more gauges to initiate a stoppage of the pump motor and/or the generation of visible, audible or otherwise readily detectable signals. Repeated contact with impurities in the conveyed fluid medium can also cause a tilting of the can with attendant more pronounced rubbing contact between the can and the rotor so that the can undergoes extensive wear and is likely to develop leaks in the region of the end wall. It is possible to divide the internal space or spaces of the improved can into two or more compartments, and each compartment can contain a separate supply of gaseous or other fluid which is monitored by a discrete gauge so that it is possible to rapidly detect the exact locus of damage to the can.

As a rule, the internal space or spaces of the can will be filled with a gaseous fluid. A liquid will be employed only if the advantages of the liquid greatly outweigh the drawbacks, such as a greater radial dimension of the tubular space and hence a greater resistance of the can to the transmission of torque-transmitting forces between the driving and driven units of the pump motor. As explained above, a liquid may be employed if the conveyed fluid medium should not be contacted by any other fluids so that it is desirable to fill the interior of the can with a fluid medium identical with the conveyed medium or media. In most instances, it suffices to employ a gaseous fluid or even a liquid which does not react, or does not readily react, with the conveyed fluid medium.

Another possibility of avoiding contact between the conveyed fluid medium and any other fluid or fluids is to employ a detector including the foil 12 of FIG. 15. This ensures that the leak or leaks in the inner and/or outer tubular wall of the can will be detected without relying on a supply of a gaseous or liquid fluid. The foil 12 will be utilized with advantage in cans which are supposed to stand substantial bending and/or other stresses. For example, the foil 12 can completely fill the space between two tubular walls of the can so that the stability of the entire can is greatly enhanced. Moreover, the foil 12 can transmit heat between the tubular walls with the aforedescribed advantages, especially as regards the removal of heat which develops as a result of the generation of eddy currents in the outer tubular wall. Such heat is conveyed to the inner tubular wall and is carried away by the conveyed fluid medium which circulates in the interior of the can.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A canned motor pump, comprising a hollow driving unit; a rotary driven unit which is at least partially surrounded by said driving unit; means for sealing fluids about said units from each other, comprising a can interposed between said units and including a plurality of walls which define a space; and means for monitoring said space for fluid leaks, said monitoring means including external sensing means responsive to leakage through said walls.

2. The pump of claim 1, wherein said driven unit is rotatable about a predetermined axis and said walls include at least two tubular walls having a common axis coinciding with or close to said predetermined axis, one of said tubular walls being at least partially surrounded by the other of said tubular walls.

3. The pump of claim 1, wherein said monitoring means includes a portion in said space.

4. The pump of claim 3, wherein said portion of said monitoring means includes a supply of a fluid in said space and said sensing means comprises a device for monitoring at least one variable characteristic, particularly the pressure, of fluid in said space.

5. The pump of claim 3, wherein said portion of said monitoring means includes means for generating signals in response to detection of a leak in at least one of said walls.

6. The pump of claim 1, wherein said walls include substantially concentric first and second tubular walls defining an annular space having a width in the radial direction of said tubular walls such as to allow for circulation of a gaseous fluid therein but to at least greatly obstruct the circulation of a liquid.

7. The pump of claim 6, wherein said tubular walls have abutting portions.

8. The pump of claim 1, wherein said walls include at least two substantially concentric tubular walls defining an annular space, said monitoring means including a supply of gaseous fluid in said space.

9. The pump of claim 8, wherein said monitoring means comprises means for maintaining the fluid in said space at a presure which deviates from the pressure around said can.

10. The pump of claim 8, wherein the pressure of fluid in said space at least slightly exceeds the pressure around said can.

11. The pump of claim 1, wherein said walls include at least two substantially concentric tubular walls defining at least one annular space, said monitoring means including means for maintaining in said at least one space a supply of fluid including means for admitting the fluid into said at least one space, and said sensing means including a pressure gauge in said admitting means.

12. The pump of claim 11, further comprising a housing fir said driving unit including a support for said admitting means, said support defining an inlet for admission of fluid into said at least one space.

13. The pump of claim 12, wherein said tubular walls have end portions in the region of said inlet and said inlet communicates with an end of said at least one annular space in the region of the end portions of said tubular walls.

14. The pump of claim 1, wherein said can has a first end and a second end and said walls include at least two substantially concentric tubular walls and an end wall at one end of said can.

15. The pump of claim 14, wherein at least a portion of said end wall includes a plurality of panels.

16. The pump of claim 15, wherein said tubular walls define a first space and said panels of said end wall define a second space which communicates with said first space.

17. The pump of claim 16, wherein said can defines a path for the flow of a gaseous fluid between said first and second spaces.

18. The pump of claim 14, further comprising means for sealingly and mechanically connecting at least one of said tubular walls to said end wall.

19. The pump of claim 18, wherein said connecting means comprises at least one welded seam.

20. The pump of claim 18, wherein said end wall includes first and second panels and said connecting means includes means for connecting one of said tubular walls with one of said panels and means for connecting another of said tubular walls with another of said panels.

21. The pump of claim 1, said monitoring means including a supply of a gaseous fluid in said at least one space and said sensing means comprising means for monitoring the pressure of said fluid.

22. The pump of claim 1, wherein said monitoring means includes a detector installed in said at least one space and arranged to transmit signals denoting the condition of at least one of said walls.

23. The pump of claim 22, wherein said sensing means comprises an alarm device which is responsive to signals from said detector.

24. The pump of claim 22, wherein said sensing means comprises means for arresting the pump in response to signals from said detector.

25. The pump of claim 22, wherein said detector includes an at least partially conductive foil in said at least one space.

26. The pump of claim 25, wherein said foil consists at least in part of a heat-conducting material.

27. The pump of claim 25, wherein said foil consists at least in part of a pressure-resistant material.

28. The pump of claim 1, wherein said walls include two at least substantially concentric tubular walls having confronting surfaces, at least one of said surfaces having protuberances extending toward the other of said surfaces.

29. The pump of claim 1, wherein said walls include at least substantially concentric tubular inner and outer walls, at least one of said tubular walls having a thickness which is a function of the pressure in the pump adjacent said one wall.

30. The pump of claim 29, wherein said one tubular wall is said outer wall.

31. The pump of claim 30, wherein the thickness of said inner tubular wall is less than that of said outer tubular wall.

32. The pump of claim 29, wherein the other of said tubular walls is elastically deformable into contact with said one wall in the event of a leak in at least one of said tubular walls.

33. The pump of claim 1, further comprising at least one pumping element receiving torque from said driven unit to thereby convey a fluid medium along a predetermined path, said space being arranged to receive a supply of such fluid medium.

34. The pump of claim 1, wherein said walls include at least substantially concentric inner and outer tubular walls; and further comprising a housing for said units and said can and means for separably mounting at least one of said tubular walls in said housing so that the one tubular wall is removable from and reinsertable into said housing.

35. The pump of claim 34, wherein said can further comprises an end wall having a panel affixed to and movable with said one tubular wall.

36. The pump of claim 34, further comprising at least one pumping element receiving torque from said driven unit, said can having a first end nearer to and a second end more distant from said at least one pumping element, said means for separably mounting comprising an external flange provided on said one tubular wall adjacent said first end of said can.

37. The pump of claim 34, further comprising at least one pumping element receiving torque from said driven unit, said can having a first end nearer to and a second end more distant from said at least one pumping element, said means for separably mounting comprising a support affixed to said one tubular wall in the region of the second end of said can.

38. The pump of claim 1, wherein said walls include at least partially concentric first and second tubular walls; and further comprising a housing for said units and said can and at least one pumping element receiving torque from said driven unit and installed in said housing, said can having a first end nearer to and a second end more distant from said at least one pumping element, and said pump also comprising means for mounting said can in said housing including a flange-like support adjacent one end of said can and having first and second portions respectively surrounding the corresponding ends of said first and second tubular walls, and sealing elements interposed between each portion of said support and the respective tubular wall.

39. The pump of claim 38, wherein said tubular walls define an annular space and said support has means for admitting a fluid into said space.

40. The pump of claim 38, wherein said housing comprises an end wall adjacent said support and said end wall has means for centering said support with reference to said driven unit.

41. The pump of claim 38, wherein said housing includes a closure adjacent said support; and further comprising a bearing for said driven unit and a seat integral with said closure and centering said bearing with reference to said units.

42. The pump of claim 41, wherein said closure includes means for centering at least one of said tubular walls.

43. The pump of claim 41, wherein said support includes means for centering said closure with reference to said units.

44. The pump of claim 1, wherein each of said walls is fixed.

45. The pump of claim 1, wherein said units comprise magnet means arranged so that said driving unit is capable of inducing rotation of said driven unit magnetically.

* * * * *